(12) United States Patent
Bhos et al.

(10) Patent No.: US 12,505,428 B2
(45) Date of Patent: *Dec. 23, 2025

(54) SYSTEMS AND METHODS FOR FOREIGN CURRENCY EXCHANGE AND TRANSFER

(71) Applicant: Wells Fargo Bank, N.A., San Francisco, CA (US)

(72) Inventors: Sayali Bhos, San Francisco, CA (US); Harmit Singh Dhanoa, San Francisco, CA (US); Laura Marie Fontana, San Francisco, CA (US); Marc Le Boeuf, San Francisco, CA (US); Matthew Shepherd, Charlotte, NC (US); Nikolai Stroke, Gilbert, AZ (US); Duc M. Trinh, Golden Valley, MN (US); Daniel G. Vogt, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,579

(22) Filed: Mar. 1, 2024

(65) Prior Publication Data

US 2024/0202712 A1 Jun. 20, 2024

Related U.S. Application Data

(63) Continuation of application No. 18/117,982, filed on Mar. 6, 2023, now Pat. No. 11,922,406, which is a
(Continued)

(51) Int. Cl.
*G06Q 20/38* (2012.01)
*G06Q 20/02* (2012.01)
(Continued)

(52) U.S. Cl.
CPC .......... *G06Q 20/381* (2013.01); *G06Q 20/02* (2013.01); *G06Q 20/3223* (2013.01); *G06Q 20/3674* (2013.01); *G06Q 20/389* (2013.01)

(58) Field of Classification Search
None
See application file for complete search history.

(56) References Cited

U.S. PATENT DOCUMENTS

| 9,147,188 B2 | 9/2015 | Dharmapalan |
| 10,410,190 B1 | 9/2019 | Kapoor et al. |

(Continued)

FOREIGN PATENT DOCUMENTS

WO WO-2019/246627 A1 12/2019

OTHER PUBLICATIONS

A Distributed-Ledger Consortium Model for Collaborative Innovation, Chris Khan, Antony Lewis, Emily Rutland, Clemens Wan, Kevin Rutter, and Clark Thompson, R3 (Year: 2017); pp. 1-9.
(Continued)

*Primary Examiner* — Peter D Nolan
*Assistant Examiner* — Matthew Cobb
(74) *Attorney, Agent, or Firm* — Foley & Lardner LLP

(57) ABSTRACT

Systems, methods, and computer-readable storage media for locking-in currency exchanges. One method includes providing, by a graphical user interface (GUI) of a wallet application, a customer request, wherein the customer request is a request for a currency transfer between a customer account of the customer to a recipient account of a recipient, wherein the customer account is associated with a first type of currency and the recipient account is associated with a second type of currency, presenting, by the GUI of the wallet application, a locked-in exchange rate for a time limit and data corresponding to the exchange rate and the time limit, exchanging, by the wallet application, an
(Continued)

amount of the first type of currency for an amount of the second type of currency based on the exchange rate, and receiving, by the GUI of the wallet application, an indication of a transferred amount for a currency transfer.

18 Claims, 25 Drawing Sheets

Related U.S. Application Data continuation of application No. 17/527,891, filed on Nov. 16, 2021, now Pat. No. 11,599,876, which is a continuation of application No. 16/583,189, filed on Sep. 25, 2019, now Pat. No. 11,182,776.

(60) Provisional application No. 62/748,452, filed on Oct. 20, 2018.

(51) Int. Cl.
 *G06Q 20/32* (2012.01)
 *G06Q 20/36* (2012.01)

(56) References Cited

U.S. PATENT DOCUMENTS

| | | | |
|---|---|---|---|
| 10,521,775 B2 | 12/2019 | Hearn et al. | |
| 2009/0063316 A1* | 3/2009 | Travis | G06Q 40/00 705/35 |
| 2012/0323786 A1 | 12/2012 | Kirsch | |
| 2013/0218657 A1 | 8/2013 | Salmon et al. | |
| 2013/0238490 A1 | 9/2013 | Bouey et al. | |
| 2016/0055583 A1* | 2/2016 | Liberty | G06Q 20/405 705/37 |
| 2016/0196553 A1 | 7/2016 | Barhydt | |
| 2016/0210626 A1* | 7/2016 | Ortiz | G06Q 20/12 |
| 2017/0161734 A1 | 6/2017 | Bankston et al. | |
| 2017/0300872 A1 | 10/2017 | Brown et al. | |
| 2017/0301047 A1 | 10/2017 | Brown et al. | |
| 2018/0075453 A1 | 3/2018 | Durvasula et al. | |
| 2019/0003488 A1 | 1/2019 | Stefanovic et al. | |
| 2019/0034888 A1* | 1/2019 | Grassadonia | G06Q 20/065 |
| 2019/0034922 A1 | 1/2019 | Castinado et al. | |
| 2019/0122222 A1 | 4/2019 | Uechi | |
| 2019/0347652 A1* | 11/2019 | Johnson | G06Q 20/065 |
| 2020/0013118 A1 | 1/2020 | Treat et al. | |
| 2020/0074419 A1 | 3/2020 | Govender | |
| 2020/0104796 A1* | 4/2020 | Cheng-Shorland | G06Q 50/188 |
| 2020/0334671 A1 | 10/2020 | Davies et al. | |
| 2021/0019738 A1 | 1/2021 | Koppelman et al. | |

OTHER PUBLICATIONS

A Multi-Chain Model for CBDC, Wei-Tek Tsai, Zihao Zhao, Chi Zhang, Lian Yu, Enyan Deng (Year: 2018); pp. 1-10.

Aiken, Roger, R3's "Blockchain-Inspired" Payments Solution Poised to Interact with Central Bank Digital Currencies, Oct. 31, 2017. 6 pages.

Blockchain based Remittances and Mining using CUDA, Bhumika Ekbote, Vaishnavi Hire, Pratik Mahajan and Jignesh Sisodia (Year: 2017); pp. 1-4.

How does TransferWise work and is it safe?, The Telegraph, https://www.telegraph.co.uk/money/transferwise/how-does-it-work-and-is-it-safe/ Aug. 30, 2018. 4 pages.

Revolut is coming to the U.S.A., https://www.revolut.com/us/, 2019. 9 pages.

Santander launches the first blockchain-based international money transfer service across four countries, https://www.santander.com/csgs/Satellite/CFWCSancomQP01/en_GB/Corporate/Press-room/Santander-News/2018/04/12/Santander-launches-the-first-blockchain-based-international-money-transfer-service-across-four-countries-.html, Mar. 12, 2018. 2 pages.

Zuckerman, Molly, "European Banks Complete First Live Securities Transfer On R3's Blockchain Platform", https://cointelegraph.com/news/european-banks-complete-first-live-securities-transfer-on-r3s-blockchain-platform, Mar. 4, 2018. 3 pages.

A Distributed-Ledger Consortium Model for Collaborative Innovation Chris Khan, Antony Lewis, Emily Rutland, Clemens Wan, Kevin Rutter, and Clark Thompson, R3 (Year: 2017).

* cited by examiner

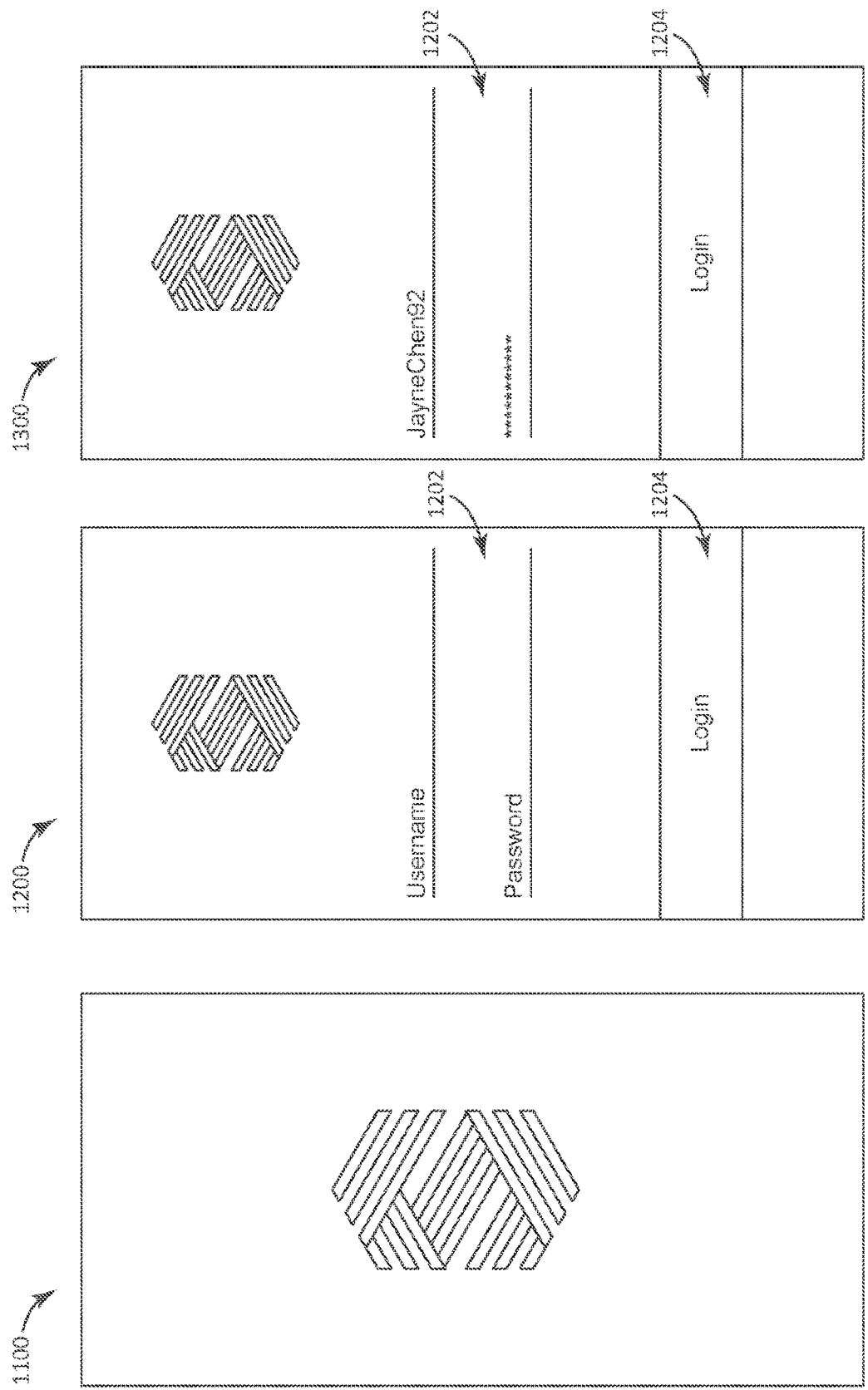

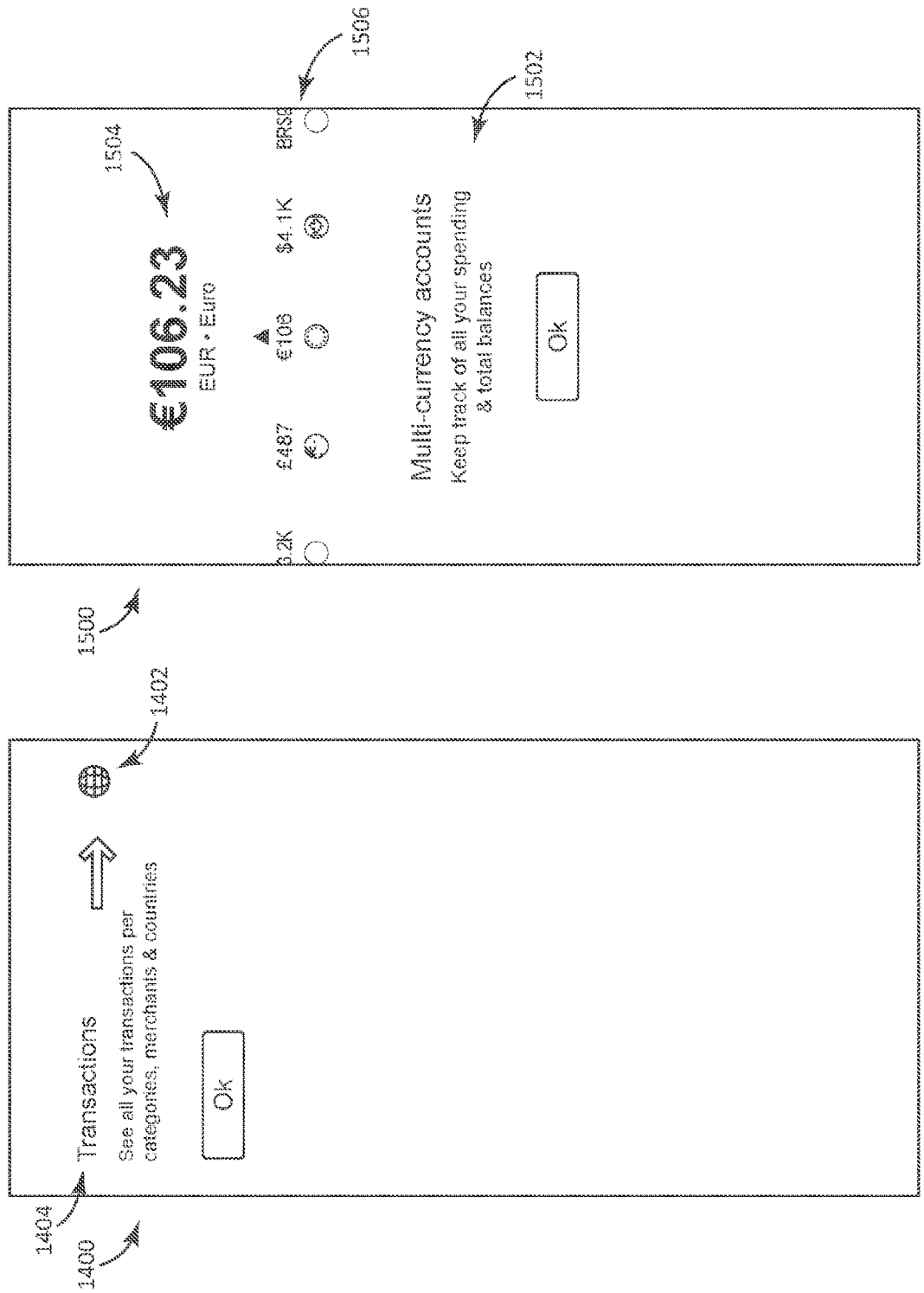

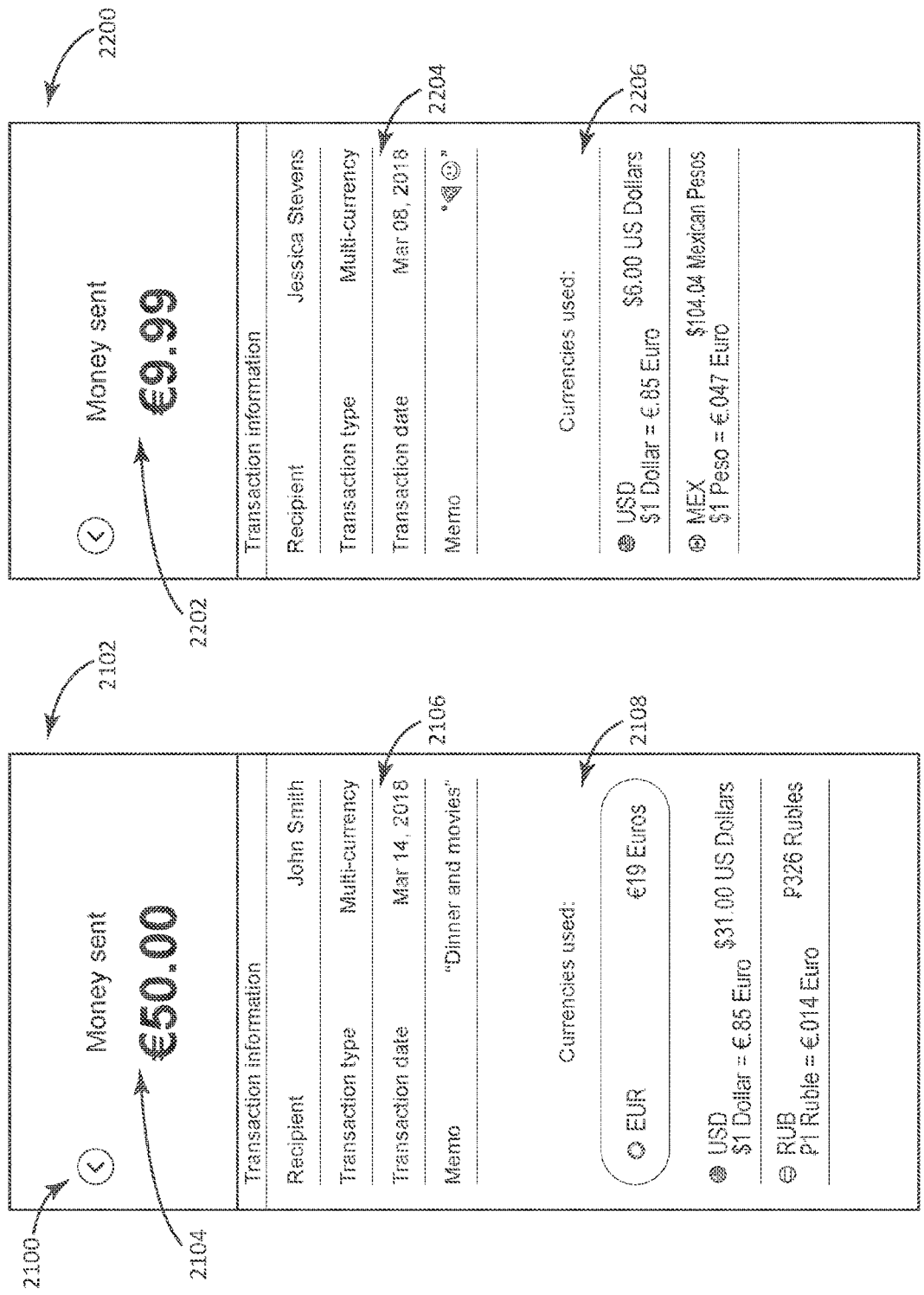

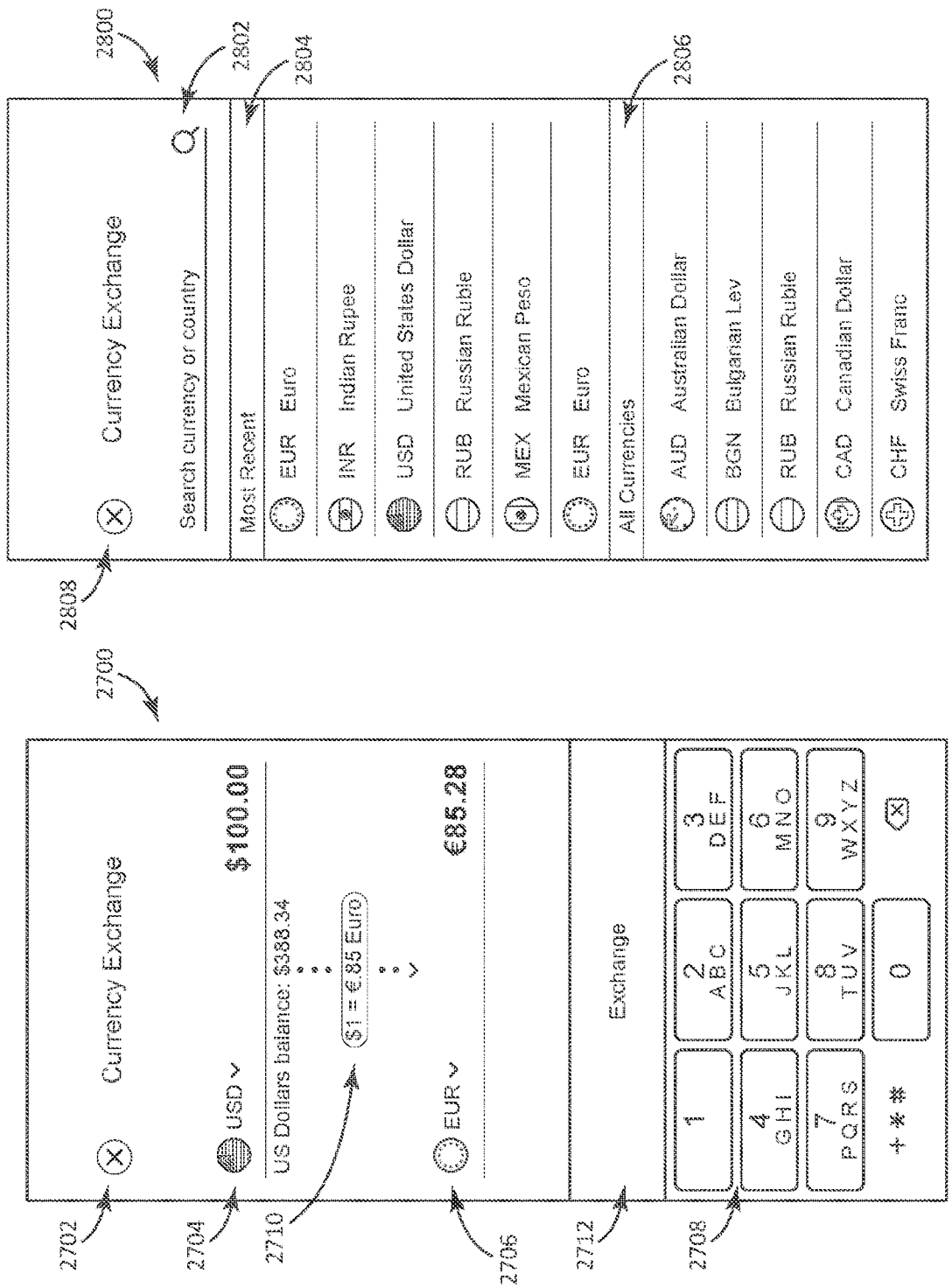

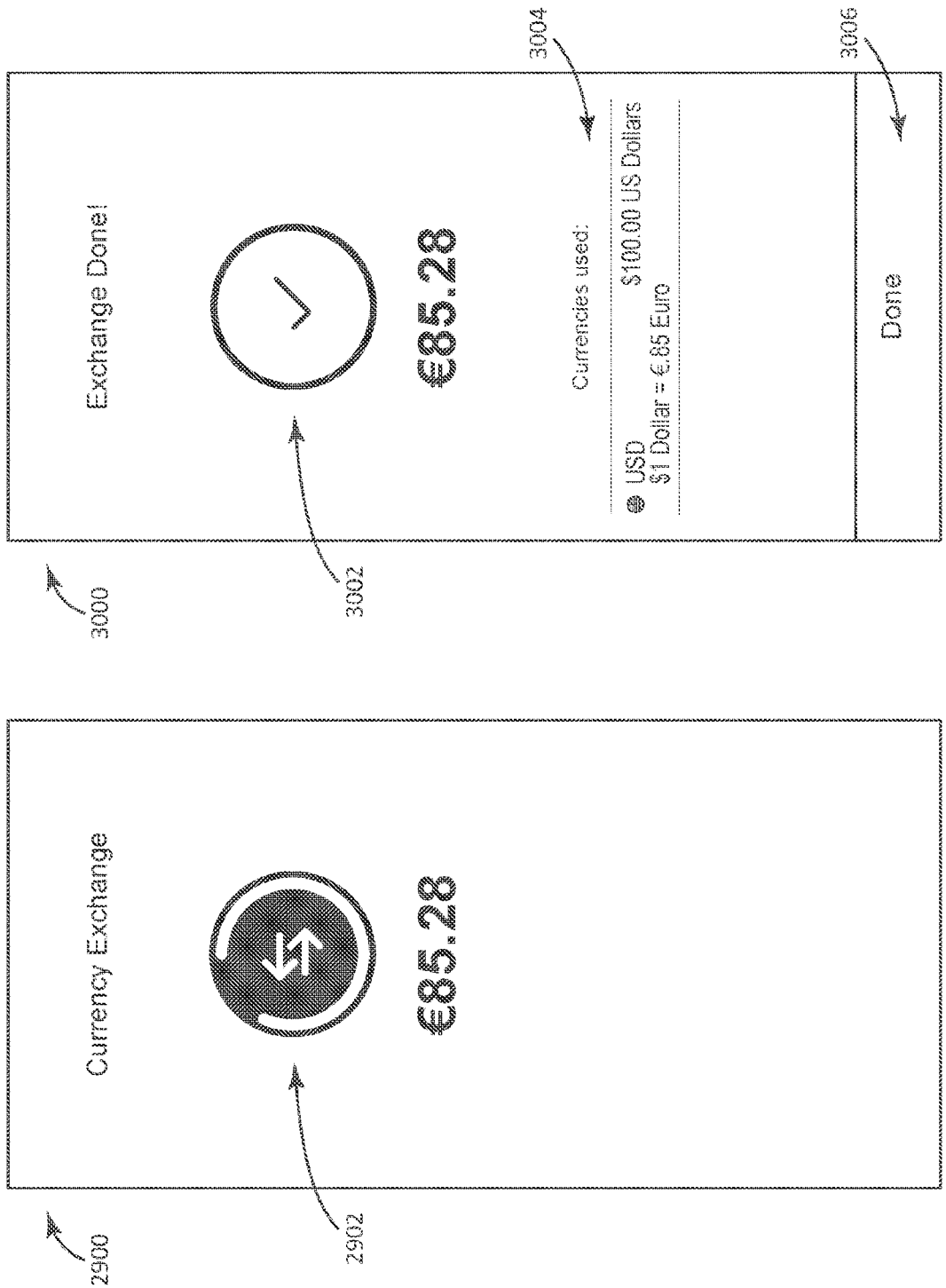

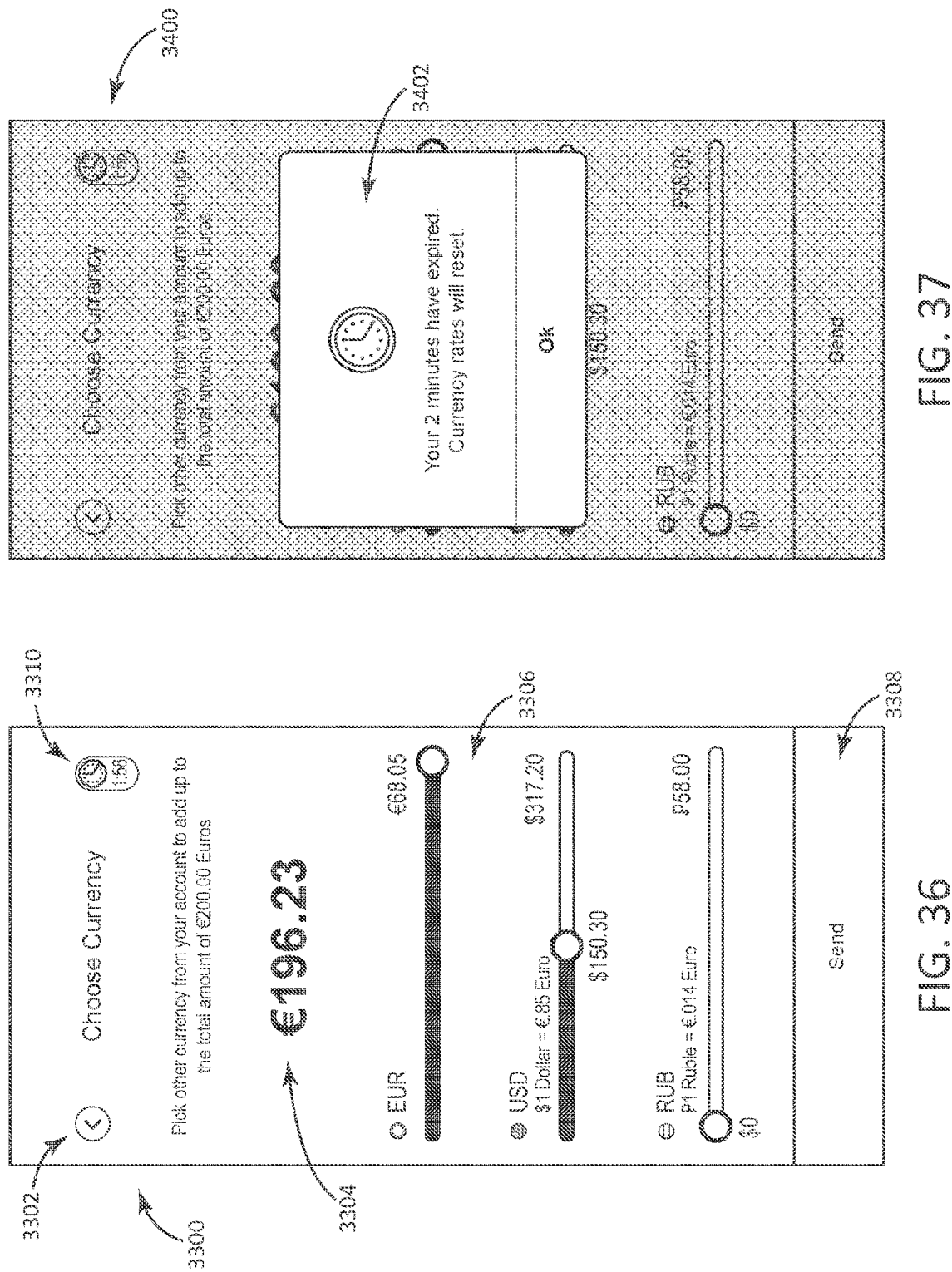

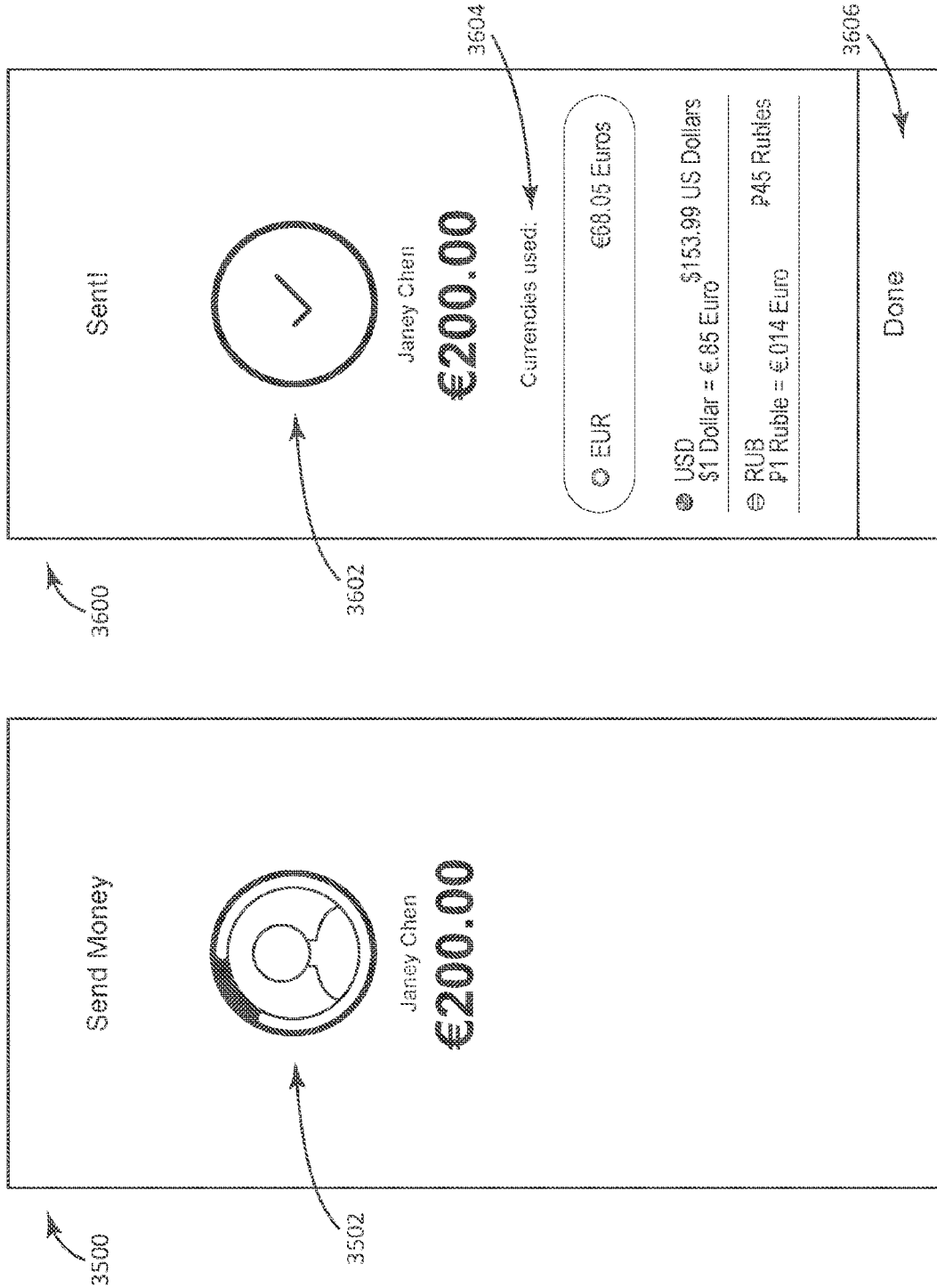

SYSTEMS AND METHODS FOR FOREIGN CURRENCY EXCHANGE AND TRANSFER

CROSS-REFERENCE TO RELATED APPLICATIONS AND CLAIMS OF PRIORITY

This application is a continuation of and claims priority to U.S. patent application Ser. No. 18/117,982, filed on Mar. 6, 2023, entitled "Systems and Methods for Foreign Currency Exchange and Transfer," which claims priority to U.S. patent application Ser. No. 17/527,891, filed on Nov. 16, 2021, now issued as U.S. Pat. No. 11,599,876, entitled "Systems and Methods for Foreign Currency Exchange and Transfer," which claims priority to U.S. patent application Ser. No. 16/583,189 filed on Sep. 25, 2019, now issued as U.S. Pat. No. 11,182,776, entitled "Systems and Methods for Foreign Currency Exchange and Transfer," which claims priority to U.S. Provisional Patent App. No. 62/748,452 entitled "Systems and Methods for Foreign Currency Exchange and Transfer," filed Oct. 20, 2018, which is related to U.S. patent application Ser. No. 17/121,252, filed on Dec. 14, 2020, now issued as U.S. Pat. No. 11,410,164, entitled "Systems And Methods For Cross-Border Payments Via Distributed Ledger-Based Payment Rail," which claims priority to U.S. patent application Ser. No. 16/413,358, filed on May 15, 2019, now issued as U.S. Pat. No. 10,878,409, entitled "Systems and Methods for Cross-Border Payments via Distributed Ledger-Based Payment Rail", which claims priority to U.S. Provisional Patent App. No. 62/748,455 entitled "Systems and Methods for Cross-Border Payments via Distributed Ledger-Based Payment Rail," filed Oct. 20, 2018, all of which are incorporated herein by reference in their entireties and for all purposes.

TECHNICAL FIELD

Embodiments of the present disclosure relate generally to the field of mobile wallets.

BACKGROUND

Payments for products and services are often completed using credit cards, debit cards, checks, and/or cash. At the same time, most people carry some type of mobile device. Electronic-based transactions may be carried out using a mobile device. For example, mobile device users may purchase goods and services through payment applications at point-of-sale terminals.

Additionally, exchanging currency often requires a customer to visit a physical branch of a financial institution, where the customer must interact with a foreign currency teller in order to exchange the currency. Similarly, in order to make payments in a foreign currency or a currency transfer to a foreign account, a customer may need to visit the physical branch or access an online banking portal and fill out a wire transfer form. Both of these processes may be time-consuming and require the customer to pay fees associated with currency exchange and/or currency transfer.

SUMMARY

One embodiment relates to a computer-implemented method. The method includes receiving, by a provider computing system associated with an accounts provider, a customer request via a mobile wallet application on a mobile device associate with a customer. The customer request includes a request for a currency transfer from a mobile wallet held by the customer to a recipient. The method also includes identifying, by the provider computing system, the recipient of the currency transfer from the customer request and a partner accounts provider associated with the recipient and communicating, by the provider computing system, with the partner accounts provider regarding the currency transfer. The method further includes transferring, by the provider computing system, an amount for the currency transfer from the mobile wallet to the partner accounts provider via an omnibus account held by the accounts provider on the distributed ledger and transmitting, by the provider computing system, a confirmation of the currency transfer to the customer.

Another embodiment relates to a provider computing system associated with an accounts provider. The provider computing system includes a network interface, a customer accounts database storing information related to various customers of the accounts provider, and a processing circuit. The processing circuit includes a processor and a memory. The memory is structured to store instructions that are executable and cause the processor to receive a customer request via a mobile wallet application on a mobile device associated with a customer. The customer request includes a request for a currency transfer from a mobile wallet held by the customer to a recipient. The instructions also cause the processor to identify the recipient of the currency transfer from the customer request and a partner accounts provider associated with the recipient and communicate with the partner accounts provider regarding the currency transfer. The instructions further cause the processor to transfer an amount for the currency transfer from the mobile wallet to the partner accounts provider via an omnibus account held by the accounts provider on a distributed ledger and transmit a confirmation of the currency transfer to the customer.

Another embodiment relates to a computer-implemented method. The method includes receiving, by a provider computing system associated with an accounts provider, a customer request via a mobile wallet application on a mobile device associated with a customer. The customer request includes a request for a currency exchange and a currency transfer from a mobile wallet held by the customer to a recipient. The method also includes identifying, by the provider computing system, the recipient of the currency transfer from the customer request and a partner accounts provider associated with the recipient; communicating, by the provider computing system, with the partner accounts provider regarding the currency transfer; and exchanging, by the provider computing system, an amount of a first type of currency for a second type of currency. The first currency amount includes funds of the mobile wallet. The method additionally includes transferring, by the provider computing system, an amount for the currency transfer from the mobile wallet to the partner accounts provider via an omnibus account held by the accounts provider on a distributed ledger. The currency transfer amount includes the second currency amount. The method further includes transmitting, by the provider computing system, a confirmation of the currency transfer to the customer.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 14-16 are graphical user interfaces showing login screens for a mobile wallet, according to various embodiments.

FIGS. 17 and 18 are graphical user interfaces describing functions of a mobile wallet, according to various embodiments.

FIGS. 24-29 are graphical user interfaces showing account cell information screens for a mobile wallet, according to various embodiments.

FIGS. 30-33 are graphical user interfaces showing currency exchange screens for a mobile wallet, according to various embodiments.

FIGS. 34-39 are graphical user interfaces showing currency transfer screens for a mobile wallet, according to various embodiments.

FIGS. 40-44 are graphical user interfaces showing add contact screens for a mobile wallet, according to various embodiments.

DETAILED DESCRIPTION

Figure 1:
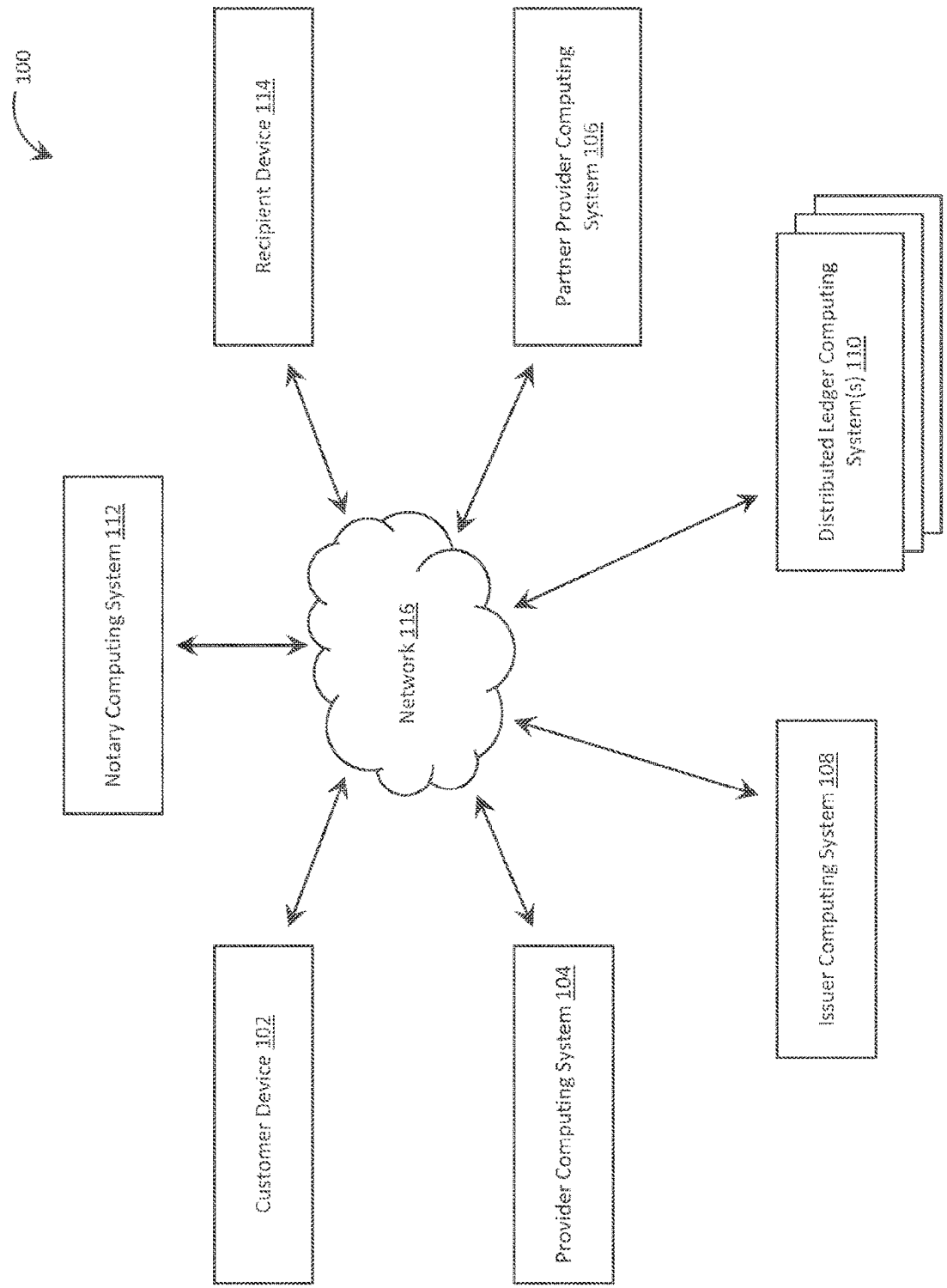
FIG. 1 is an environmental view of a system for foreign currency exchange and transfer, according to one embodiment.

Referring generally to the figures, various systems, methods, and apparatuses for foreign currency exchange and transfer are described herein. An example implementation is described as follows. A customer holds a mobile wallet with a mobile wallet provider. As described in more detail below, a "mobile wallet" is a digital wallet provided on a user's mobile device that includes payment capabilities. The customer funds the mobile wallet with an amount of currency (e.g., from an account held by the customer with the mobile wallet provider, by associating the mobile wallet with an account held by the customer with the mobile wallet provider). Using the mobile wallet, the customer can exchange currency in the customer's mobile wallet for a second currency. The customer can then make purchases or payments from the customer's mobile wallet using the second currency. Additionally, the customer can transfer currency in the customer's mobile wallet to a recipient in a foreign country (e.g., with the recipient receiving the transferred currency in a mobile wallet held by the recipient). On the back end of the mobile wallet, in various embodiments, the provider facilitates currency transfers by using a distributed ledger as the payment rail for the currency transfer (e.g., in lieu of using traditional nostro and vostro accounts). For example, the provider sends the currency transfer from an omnibus account held by the provider on the distributed ledger to an omnibus account held by a partner provider associated with the recipient of the currency transfer (e.g., the provider of a mobile wallet held by the recipient, the provider of an account held by the recipient). In some embodiments, the distributed ledger is used to supplement traditional payment rails. As an example, the provider sends a currency transfer to the partner provider using the distributed ledger. Traditional nostro and vostro accounts are later used to facilitate case settlement (e.g., as a deferred net settlement using existing rails), which requires a traditional bilateral agreement between the provider and the partner provider. Once the currency transfer is performed, the currency transfer is recorded on the distributed ledger by both the provider and the partner provider and verified by a notary to keep a record of the transfer. Alternatively, the currency transfer is verified by consensus protocol of the distributed ledger itself with no dependency on a central entity such as a notary.

The systems, methods, and apparatuses for foreign currency exchange and transfer described herein provide advantages over the prior art. Currently, customers must often visit branch locations of the provider and interact with a foreign currency teller to make currency exchanges. This can be inconvenient and time-consuming for the customer, and there may be fees for the customer for exchanging currency. Additionally, the provider must train specific foreign currency tellers to carry out currency exchanges. Similarly, to make currency transfers to a foreign country, customers must often visit branch locations or log into online banking portals to fill out a wire transfer request form, which may also be time-consuming. Further, wire transfers typically require the customer to pay fees for the wire transfer service. Alternatively, the customer may use an automatic clearing house ("ACH") transfer, but ACH transfers typically take longer than wire transfers (e.g., days instead of hours) and may not be available for transfers to banks outside of the U.S.

The present systems and methods for foreign currency exchange and transfer allow the customer to conveniently exchange currency and carry out currency transfers using a mobile wallet provided on a mobile device of the customer. This saves the customer time and fees, as well as saves the provider the expense of training foreign currency tellers. Additionally, the present systems and methods streamline currency exchange and currency transfer actions, as described in further detail below, thereby increasing the efficiency of provider and partner provider computing systems involved in these transactions.

Additionally, in current applications and programs that allow for foreign currency transfers, the transfers typically occur through traditional nostro and vostro accounts (e.g., where the provider and the partner provider hold accounts with each other or where the provider and the partner provider hold accounts with a third party). The provider and the partner provider communicate settlement instructions through a secure network, such as Society for Worldwide Interbank Financial Telecommunication ("SWIFT") or Fedwire, and the settlement of the currency transfer may take hours to days. Additionally, cross-border transfers often involve transferring funds across different time zones. This can further delay transfers because certain banks do not process transactions outside of business hours. Further still, certain cross-border payments must traverse through several correspondent banks, each of which delays settlement and charges additional fees.

For example, using current systems and methods, the operating window for global U.S. dollar clearing may be 6 hours per day, 5 days per week. Moreover, certain limitations may apply to the processing of wire transfers in specific regions, such as Europe's first external wire transfer being processed at 11 am local time and Asia Pacific ("APAC") never being funded in local time. This may be, for instance, due to the need to use correspondent banks in making the transfer that may not have overlapping operating windows with the source bank or branch and/or the receiving bank or branch for the transfer (i.e., there is not a point of time during the day in which both entities are clearing transactions). Alternatively, this may be due to the source bank or branch and the receiving bank or branch not having overlapping operating windows.

By contrast, the present systems and methods for currency transfer occur via a distributed ledger currency rail. The distributed ledger allows each of the provider and the partner provider to keep a record of the currency transfer, allowing, for example, comparison of the two records to verify the accuracy of the transaction. As such, the currency transfer may occur more quickly through the present systems and methods than for wire transfers or for applications or programs using traditional nostro and vostro accounts, such as in minutes instead of hours or days. Moreover, the distributed ledger allows both the provider and the partner provider to keep a known record of the transfer for compliance and security purposes. Additionally, the actions involved in the currency transfer according to the present systems and methods may be automated (e.g., through smart contracts), thereby increasing the efficiency of human labor and computing systems involved in currency transfers and freeing bandwidth and processing capabilities of these computing systems for other actions. Currency transfers according to the present systems and methods may also save accounts providers fees related to using SWIFT messages and correspondent banks, and the distributed ledger rail itself may require minimal cost to operate and maintain. Moreover, the distributed ledger payment rail system is operable with existing payment rails and accounting methodology and may therefore require minimal effort to be implemented with existing systems.

The present systems and methods may also widen the window for global U.S. dollar clearing (e.g., due to the elimination of correspondent banks). As an example, the window may be widened to 24 hours per day or nearly 24 hours per day, 5 days per week, such as more than 18 hours, more than 19 hours, 20 hours, more than 20 hours, 22.5 hours, 18-23 hours, 20-23 hours, and so on per day, 5 days per week. Similarly, the present systems and methods may allow clients to transfer funds in region hours, such as allowing transfers of funds in Europe and APAC in region hours. In turn, this may, for example, alleviate client billing problems for book transfers related to the use of external channels. For example, this may allow the customer to make direct real-time transfers from one country to another due to the expanded window for clearing, where a direct real-time transfer would not otherwise be possible due to the limited operating window at the source, correspondent, and/or receiving bank or branch.

Further still, in current systems, settlement and reconciliation may be problematic with cross-border payment systems. Each entity in existing cross-border transfer systems maintains its own general ledger and accounting system for managing customer accounts. Because no two banks can agree on a transaction based on their own ledger, SWIFT came into being to guarantee and confirm message transmission. Reconciliation can also be problematic if the payment messages contain errors or omissions. Unreconciled or unconfirmed payment messages can require substantial human effort to manually fix problematic payment messages.

However, in the systems and methods described herein, the distributed ledger payment rail provides a single record of transactions that is distributed amongst nodes. This eliminates the need for reconciliation because transactions are finalized when cash states exchange ownership. Thus, finality is reached more quickly than with traditional payment rails. Moreover, using a single ledger avoids a batch reconciliation process, thus saving resources. Additionally, use of an independent third-party issuer as described in further detail below may ease the burden of foreign regulatory compliance, as any given country has a cleaner "line-of-sight" to the underlying assets, which are all held by an independent third-party account.

Referring now to FIG. 1, a system 100 for foreign currency exchange and transfer is shown, according to an example embodiment. The system 100 includes a customer device 102, a provider computing system 104, a partner provider computing system 106, an issuer computing system 108, one or more distributed ledger computing systems 110, a notary computing system 112, and a recipient device 114 connected by a secure network (e.g., network 116).

Figure 2:
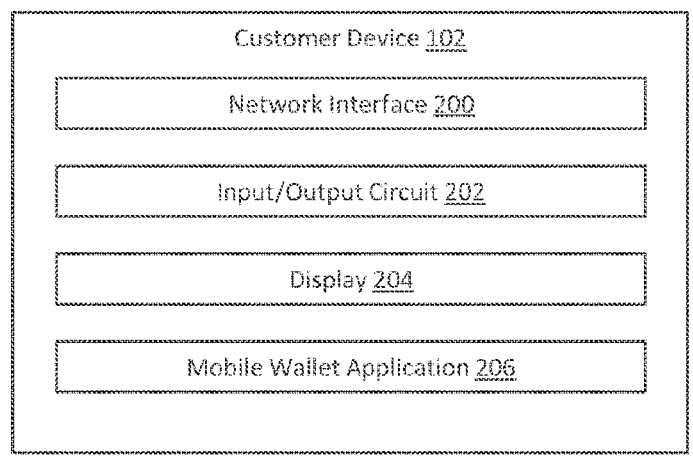
FIG. 2 is a detailed schematic diagram of a customer device of FIG. 1, according to one embodiment.

Referring now to FIG. 2, a detailed schematic diagram of the customer device 102 is shown, according to an example embodiment. The customer device 102 is associated with a customer of the provider. In various embodiments, the provider is a provider of mobile wallet accounts, and the customer holds a mobile wallet account with the provider. Additionally, in some embodiments, the customer holds one or more additional accounts with the provider, such as a checking account, a savings account, and/or a business account. In various arrangements, the customer device 102 is a mobile device, such a smartphone, a tablet, a laptop, a smart watch, smart glasses, and so on. Alternatively, in some arrangements, the customer device 102 is a non-mobile device, such as a desktop computer (e.g., the mobile wallet is implemented as an extension or add-in to a web browser operating on the desktop computer). As shown in FIG. 2, the customer device 102 includes a network interface 200, an input/output circuit 202, a display 204, and a mobile wallet application 206.

The network interface 200 includes program logic and/or components that facilitate connection of the customer device 102 to the network 116. Accordingly, the network interface 200 supports communication between the customer device 102 and other components of the system 100, such as the provider computing system 104.

The input/output circuit 202 is structured to receive communications from and provide communications to a user of the customer device 102. In this regard, the input/output circuit 202 is structured to exchange data, communications, instructions, etc. with an input/output component of the customer device 102. Accordingly, in one embodiment, the input/output circuit 202 may include an input/output device, such as a touchscreen, a keyboard, a microphone, or a speaker. In another embodiment, the input/output circuit 202 may include communication circuitry for facilitating the exchange of data, values, messages, and the like between an input/output device and the components of the customer device 102. In yet another embodiment, the input/output circuit 202 may include machine-readable media for facilitating the exchange of information between the input/output device and the components of the customer device 102. In still another embodiment, the input/output circuit 202 may include any combination of hardware components (e.g., a touchscreen), communication circuitry, and machine-readable media.

The display 204 may be a screen, a touchscreen, and the like. The customer device 102 may use the display 204 to communicate information to the customer (e.g., by displaying the information to the customer on the display 204) and/or to receive communications from the customer (e.g., through a keyboard provided on a touchscreen of the display 204). In some embodiments, the display 204 may be a component of an input/output device, as described above.

With respect to the mobile wallet application 206, in some embodiments, the mobile wallet application 206 includes a circuit embodied within the customer device 102. For example, the mobile wallet application 206 may include program logic stored in a system memory of the customer device 102. In such arrangements, the program logic may configure a processor of the customer device 102 to perform various mobile wallet functions described below with respect to the provider computing system 104. In some embodiments, the mobile wallet application 206 is a web-based application, and many of the functionalities are provided by the provider computing system 104. Accordingly, as will be understood, the level of functionality that resides on the customer device 102 versus the provider computing system 104 will vary depending on the implementation.

It should also be understood that the role the mobile wallet application 206 takes in transactions will depend on the implementation of the mobile wallet. For example, in some arrangements, the mobile wallet may be configured in a secure element framework. In a secure element framework, the customer device 102 includes a secure element that is separate from the main system memory of the customer device 102 (e.g., any element having smart card functionalities, such as a universal subscriber identify circuit (a "SIM" card) or a secure digital card). Mobile wallet data is stored in the secure element on the customer device 102. As another example, in other arrangements, the mobile wallet may be configured under a host card emulation ("HCE") framework. In an HCE framework, mobile wallet data is maintained within a cloud-based environment. The cloud-based environment may enable provisioning of usable objects, such as payment cards or stored currency, and/or mobile wallet functionalities to the mobile wallet application 206 on the customer device 102. In this regard, for example, payment tokens representing payment cards held by the customer may be stored in the customer device 102 for a limited time (or a limited number of events) until they expire, and then new payment tokens may be provisioned to the customer device 102. In yet other arrangements, the mobile wallet is implemented as a hybrid between a secure element framework and an HCE. All such variations are intended to fall within the scope of the present disclosure.

The mobile wallet application 206 is structured to enable the customer to load the customer's mobile wallet (e.g., held as part of a mobile wallet account with the provider computing system 104) with currency. For example, the mobile wallet application 206 may display user interfaces to the customer facilitating the customer in charging a payment card, such as a debit card or a credit card, to add currency to the customer's mobile wallet. As another example, the mobile wallet application 206 may facilitate the customer in making a transfer from a payment account (e.g., a demand deposit account) held by the customer to the customer's mobile wallet. Alternatively, the customer may use a web-based application, such as an online banking portal or a mobile banking application, to make a transfer from the customer's payment account to the customer's mobile wallet. In some arrangements, the customer may make a transfer from an account held by the customer with the provider computing system 104.

Once loaded with currency, the customer may make payments from the customer's mobile wallet using the loaded currency. As an illustration, the mobile wallet application 206 may present the customer with displays enabling the customer to engage in transactions (e.g., person-to-person payments, payments for goods or services at point-of-sale terminals of merchants, etc.).

In some arrangements, the mobile wallet application 206 engages in transactions through communication with, for example, merchant point-of-sale devices. In this regard, the customer device 102 may include a near-field communication ("NFC") device configured to exchange information with a merchant point-of-sale device, and the mobile wallet application 206 may engage in a transaction via the NFC device of the customer device 102. In other arrangements, the mobile wallet application 206 engages in mobile wallet transactions through the display 204. For example, the customer device 102 may display a Quick Response Code ("QR code") such that a third party can scan the QR code during a mobile wallet transaction. Additionally, in some embodiments, the mobile wallet application 206 is further structured to enable the customer to register tokenized versions of payment cards to the customer's mobile wallet and engage in transactions using the tokenized payment cards.

The mobile wallet application 206 is also structured to enable the customer to exchange the loaded currency for a second type of currency. For example, in response to receiving a request to exchange currency, the mobile wallet application 206 may display user interfaces allowing the customer to select an available second currency for the exchange, input an amount of loaded currency that the customer would like to exchange or an amount of the second currency the customer would like to exchange the loaded currency for, and confirm the currency exchange. The mobile wallet application 206 may accordingly communicate with the provider computing system 104 to exchange the currency, as described in further detail with respect to the provider computing system 104 below.

Further, the mobile wallet application 206 is structured to enable the customer to make a currency transfer to a recipient holding a foreign account with a foreign account provider (e.g., a recipient holding an account with a provider located in a country different from the country in which the customer holds one or more payment accounts and/or in which the customer's mobile wallet account is based). In some arrangements, the customer may make a currency transfer to a recipient holding a demand deposit account with a foreign demand deposit account provider. In other arrangements, the customer may make a currency transfer to a recipient holding a mobile wallet account with a foreign mobile wallet account provider. As such, the mobile wallet application 206 may provide the customer with user interfaces facilitating the customer in making the currency transfer, as also described in further detail below. For example, the user interfaces may enable the customer to input information regarding the amount of currency to send, the type of currency to send, and the recipient of the currency transfer. Additionally, in some embodiments, the customer may carry out a currency exchange and a currency transfer simultaneously (e.g., by selecting an amount of a first, loaded type of currency that the customer would like to transfer to a recipient as a corresponding amount of a second type of currency).

In some embodiments, the customer may select the recipient by performing a search via the mobile wallet application 206 using identifying information associated with the recipient (e.g., an email, a phone number, the recipient's name and location, etc.). As such, the recipient must also have a mobile wallet or otherwise be registered with the provider computing system 104 before the customer can make the currency transfer to the recipient. Alternatively, or additionally, the customer may select the recipient by providing identifying information for the recipient to the mobile wallet application 206 (e.g., via a user interface asking for certain information about the recipient), which the mobile wallet application 206 transmits to the provider computing system 104. In response, the provider computing system 104 arranges for the customer to receive the currency transfer. For example, the provider computing system 104 contacts the recipient using the identifying information provided by the customer to set up a mobile wallet account by which the recipient may receive the currency transfer. As another example, the provider computing system 104 communicates with the recipient's account provider using the identifying information (e.g., including personal information that identifies the recipient and the recipient's account provider) in order to arrange the currency transfer. Further, in some arrangements, the recipient may carry out a verification process before the recipient may receive a currency transfer from the customer. For example, the recipient must respond to a confirmation email sent by the provider computing system 104 (e.g., by clicking on a link in the email), must answer a security question set up by the customer, and so on, after which the customer may select the recipient using the mobile wallet application 206.

Figure 3:
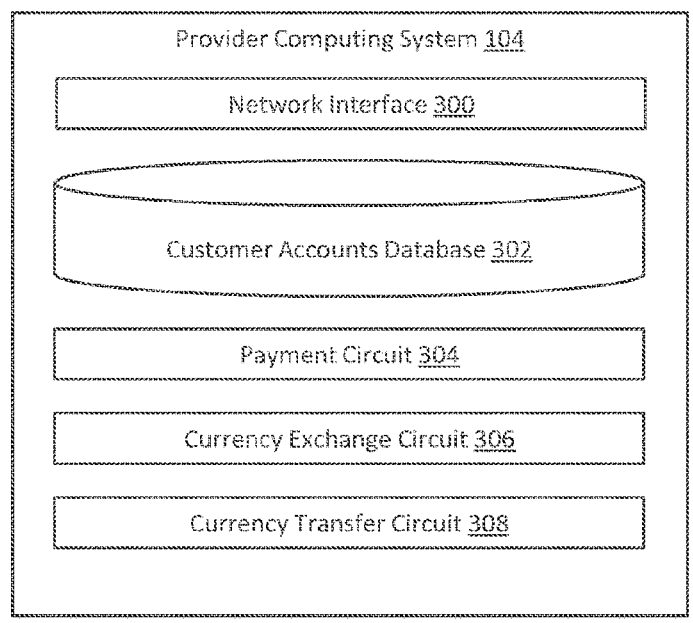
FIG. 3 is a detailed schematic diagram of a provider computing system of FIG. 1, according to one embodiment.

Referring now to FIG. 3, a detailed schematic diagram of the provider computing system 104 is shown, according to an example embodiment. As described above, the provider computing system 104 is associated with the provider of the customer's mobile wallet account and, in some embodiments, one or more payment accounts held by the customer. For example, in some arrangements, the mobile wallet provider may be a financial institution (e.g., a bank, a credit union, a credit card company, etc.). In other arrangements, the provider may be a third-party mobile wallet provider. As shown in FIG. 3, the provider computing system 104 includes a network interface 300, a customer accounts database 302, a payment circuit 304, a currency exchange circuit 306, and a currency transfer circuit 308.

In some arrangements, the customer's mobile wallet account may be a separate payment account that may or may not be linked to another payment account held by the customer. In one example, the customer's mobile wallet account may be a standalone account operable based on the customer loading currency to the mobile wallet account, as described in further detail below. In another example, the customer's mobile wallet account may be an account that may be loaded with currency and that may also be used to make payments from an associated payment account, such as a checking account held by the customer with the provider. Alternatively, in other arrangements, the customer's mobile wallet account may be the same as a payment account held by the customer. For example, the mobile wallet account may be a checking account held by the customer with the provider.

The network interface 300 includes program logic and/or components that facilitate connection of the provider computing system 104 to the network 116. Accordingly, the network interface 300 supports communication between the provider computing system 104 and other components of the system 100, such as the customer device 102, the partner provider computing system 106, the issuer computing system 108, and the one or more distributed ledger computing systems 110.

The customer accounts database 302 is structured to retrievably store mobile wallet information related to various customers of the provider. For example, the customer accounts database 302 may store biographical information about various customers (e.g., names, addresses, birthdays, emails, phone numbers, etc.), mobile wallet account information about various customers (e.g., account balances, account histories, etc.), template or reference access credentials for various customers for using their respective mobile wallets (e.g., passwords, PINs, order numbers, biometrics, customer device 102 data, etc.), and the like. Furthermore, in some arrangements, the customer accounts database 302 is structured to retrievably store other account information related to various customers of the provider. As an example, the customer accounts database 302 may store payment account information (e.g., account balances, account histories, payment card information, etc.) relating to payment accounts also held by customers of the provider.

The payment circuit 304 is structured to load currency to the customer's mobile wallet. As an example, the payment circuit 304 may receive a request from the mobile wallet application 206 to load currency to the customer's mobile wallet using a payment card or a payment account. The payment circuit 304 uses the payment card or payment account information (e.g., provided by the customer via the mobile wallet application 206, saved in the customer accounts database 302) to transfer currency to the customer's mobile wallet using traditional payment channels (e.g., by charging the amount of the currency the customer would like to load to the payment card or debiting the amount of the currency from the customer's payment account). As another example, the payment circuit 304 is configured to link a payment account held by the customer (e.g., with the provider associated with the provider computing system, with a third-party accounts provider), such as a demand deposit account, to the customer's mobile wallet. Linking the customer's payment account to the customer's mobile wallet may, for instance, allow the customer to load the customer's mobile wallet with currency from the payment account and/or directly make currency exchanges and/or transfers using funds in the customer's payment account.

Additionally, the payment circuit 304 is further structured to facilitate payments from the customer's mobile wallet account. For example, the payment circuit 304 may receive a request from the mobile wallet application 206 or from a merchant point-of-sale device to make a payment. In response, the payment circuit 304 may make a transfer to a provider of a merchant account. As an example, the customer may make a transfer of currency that the customer has loaded to the customer's mobile wallet or a transfer of currency from a payment account that the customer has linked the customer's mobile wallet (e.g., both of which may be considered a transfer of "loaded currency") to the merchant account. Additionally, if the customer is making a payment using a tokenized payment card, the payment circuit 304 may detokenize the payment card (e.g., using a token vault stored by the provider computing system 104 or by a third-party token provider) and use the payment account associated with the tokenized payment card to make the transfer.

The currency exchange circuit 306 is structured to exchange a first currency stored in the customer's mobile wallet (e.g., starting currency) for a second type of desired currency (e.g., desired currency). In some embodiments, the currency exchange circuit 306 provides a list of available currencies that the customer can exchange for to the mobile wallet application 206. As such, the customer may, for example, select the desired currency from a list or search for through user interfaces provided by the mobile wallet application 206. Additionally, the currency exchange circuit 306 is configured to provide the exchange rates for the available currencies to the mobile wallet application 206 (e.g., the exchange rates at the time the customer selects a loaded currency for exchange, the exchange rates according to set times such that the exchange rates shown to the customer are refreshed at those times, such as once a day or hour, etc.). The currency exchange circuit 306 is also configured to receive via the mobile wallet application 206 the type of loaded, starting currency that the customer would like to use in the exchange transaction (e.g., from multiple types of currencies the customer has loaded to the customer's mobile wallet account), as well as the amount of starting currency the customer would like to use or the amount of the desired currency the customer would like to exchange to. In some arrangements, the customer may carry out a currency exchange using multiple types of currency. For example, the customer may input amounts of more than one starting currency to be used for the exchange (e.g., U.S. dollars and Canadian dollars) and/or input amounts of more than one desired currency to be exchanged to (e.g., pounds and Euros).

Once the currency exchange circuit 306 receives the types of currencies and amount(s) the customer would like to exchange, the currency exchange circuit 306 confirms the current exchange rate and conversion for the customer. For example, the currency exchange circuit 306 determines the current exchange rate and the corresponding amounts of loaded starting currency or currencies that will be debited and desired currency or currencies that will be credited to the customer's mobile wallet. The currency exchange circuit 306 also provides a certain amount of time for the customer to confirm that the customer would make the exchange at that rate via the mobile wallet application 206. In response to receiving a confirmation of the exchange from the customer, the currency exchange circuit 306 carries out the currency exchange in the customer's mobile wallet.

Figure 4:
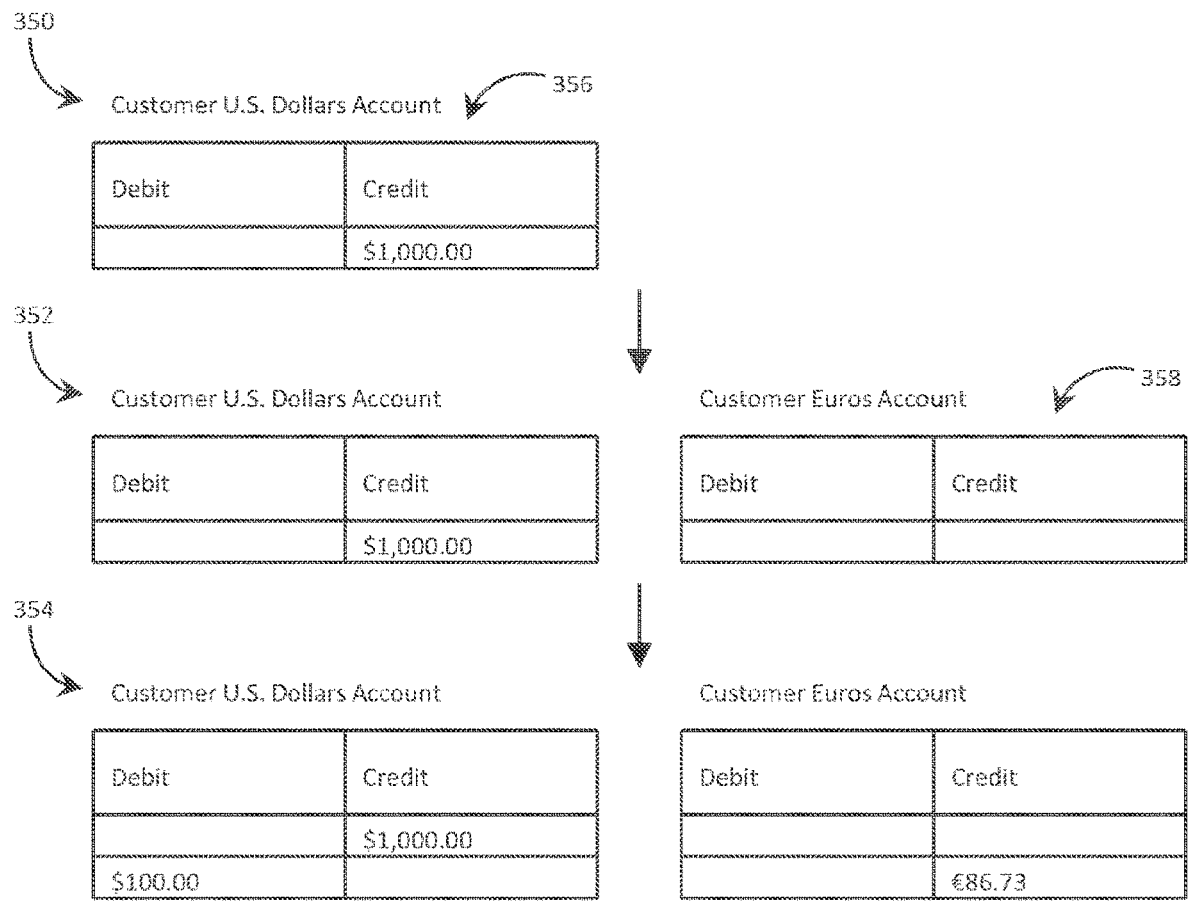
FIG. 4 is a block diagram depicting a currency exchange, according to one embodiment.

In some embodiments, the currency exchange circuit 306 is configured to set up a separate account (e.g., a separate payment account) for each type of currency that the customer holds in the customer's mobile wallet, where each account is linked to the customer's mobile wallet. For example, when the customer wants to exchange a currency held in the customer's mobile wallet for a new type of currency, the currency exchange circuit 306 creates a new account for the customer (e.g., a new mobile wallet account, a new demand deposit account associated with the customer's mobile wallet) that the customer holds with the provider, where the new account is associated with the new type of currency. FIG. 4 illustrates a block diagram depicting a currency exchange using multiple customer accounts, according to an example embodiment. At 350, the customer holds an account 356 in U.S. dollars. At 352, the customer has initiated a currency exchange from dollars to Euros. As such, the currency exchange circuit 306 sets up a new account 358 for the customer in Euros (e.g., because this is the first time the customer has made an exchange to Euros). At 354, the customer's U.S. dollars account 356 is debited $100.00, and the customer's Euros account 358 is credited €86.73 (e.g., at an exchange rate of 0.8673). The customer may now make payments, transfers, and/or exchanges from the Euros account 358 using the currency that has been received in the exchange. Accordingly, it should be understood that the currency exchange circuit 306 may set up a new currency account for the customer for each type of currency that the customer wishes to receive in the exchange. The customer may thus hold multiple currency accounts simultaneously, each of which is accessible in the customer's mobile wallet (e.g., via the mobile wallet application 206). Alternatively, in some embodiments, each type of currency may be held in the same account of the customer and held in different partitions within the same account (e.g., different partitions within the customer's mobile wallet account, different partitions within a demand deposit account held by the customer with the provider and associated with the mobile wallet).

Figure 5:
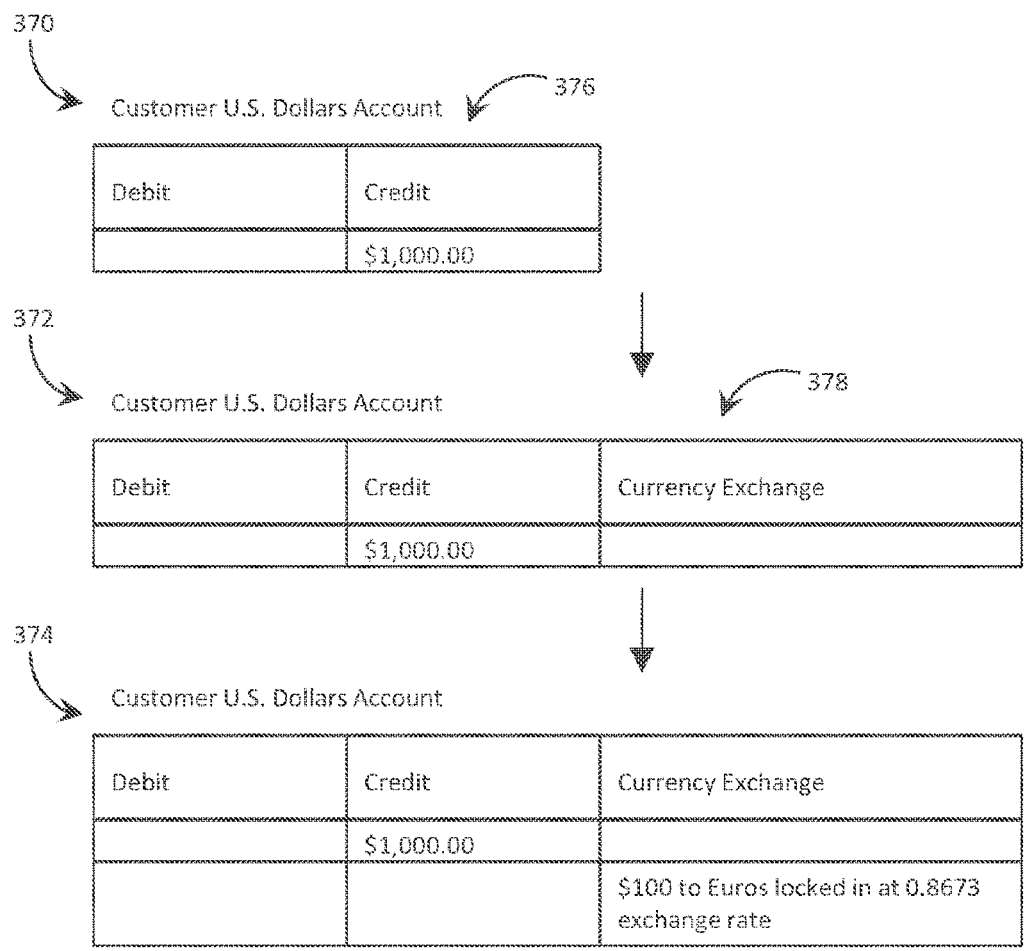
FIG. 5 is a block diagram depicting a currency exchange, according to another embodiment.

In other embodiments, the currency exchange circuit 306 may provide the desired currency to the customer without setting up multiple accounts for the customer. As an example, rather than actually carrying out the exchange, the currency exchange circuit 306 may lock down the exchange rate for the amount of currency that the customer has selected when the customer confirms the currency exchange. FIG. 5 illustrates a block diagram depicting a currency exchange where the currency amount is locked down at the exchange rate, according to an example embodiment. At 370, the customer holds an account 376 in U.S. dollars. At 372, the customer has initiated a currency exchange from dollars to Euros, and the currency exchange circuit 306 accordingly creates an annotation section 378 in the customer's U.S. dollars account 376. At 374, the currency exchange circuit 306 indicates in the annotation section 378 that the customer has $100 to Euros locked in at a 0.8673 exchange rate. Accordingly, when the customer wants to spend or transfer Euros in the future from the customer's mobile wallet account, the currency exchange circuit 306 will convert the customer's dollars to Euros at the locked-in exchange rate (e.g., by transferring a corresponding amount of U.S. dollars at the locked-in rate to an omnibus account held by the provider and transferring the amount of Euros from the omnibus account to the recipient of the payment or transfer).

Referring back to FIG. 3, the currency transfer circuit 308 is structured to carry out a currency transfer requested by the customer using the customer's mobile wallet. For example, the currency transfer circuit 308 receives an amount for the currency transfer and a recipient of the currency transfer from the mobile wallet application 206, which the customer provided via user interfaces presented to the customer by the mobile wallet application 206. The currency transfer circuit 308 identifies the recipient and the recipient's account provider to which the transfer is to be made, for example, using information stored about the recipient in the customer accounts database 302, using information provided by the customer via the mobile wallet application 206, by communicating with the recipient using contact information provided by the customer via the mobile wallet application 206, and so on. In some arrangements, the currency transfer circuit 308 may request additional information about the recipient from the customer if the currency transfer circuit 308 is unable to identify the recipient and/or the recipient's account provider based on initial information provided by the customer. Once the currency transfer circuit 308 identifies the recipient and the recipient's account provider, the currency transfer circuit 308 carries out the currency transfer. In various embodiments, the currency transfer circuit 308 carries out the currency transfer using a distributed ledger currency rail, as described in further detail below with respect to FIG. 12. Additionally, in various arrangements, once the currency transfer has been carried out, the currency transfer circuit 308 provides a confirmation message to the customer (e.g., via the mobile wallet application 206, by sending the customer an email or text message confirmation, etc.).

It should be understood that, in some embodiments, the provider computing system 104 may carry out a currency exchange and currency transfer simultaneously (e.g., in response to the customer requesting that an amount of a first type of currency be transferred to the recipient as a second type of currency). Additionally, it should be understood that, in some embodiments, the provider computing system 104 may simultaneously load the customer's mobile wallet with a currency and carry out a currency exchange and/or currency transfer. As an example, the provider computing system 104 may simultaneously load and exchange currency in response to the customer requesting that an amount of first currency be exchanged for a second current when the customer's mobile wallet does not include enough first currency for the exchange such that more first currency must be loaded to the customer's mobile wallet.

Figure 6:
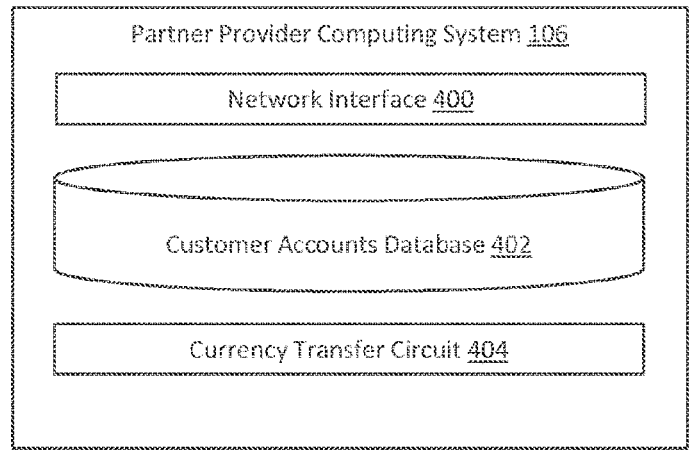
FIG. 6 is a detailed schematic diagram of a partner provider computing system of FIG. 1, according to one embodiment.

Referring now to FIG. 6, a detailed schematic diagram of the partner provider computing system is shown, according to an example embodiment. The partner provider computing system 106 is associated with a provider of an account held by the recipient of a currency transfer, such as a mobile wallet account or a demand deposit account. Additionally, the recipient's account provider is a partner provider of the customer's provider such that the partner provider can receive currency transfers from the provider of the customer's mobile wallet. In some arrangements, the partner provider is a financial institution (e.g., a bank, a credit union, a credit card company, etc.), similar to the provider. In other arrangements, the partner provider is associated with the provider through a parent financial institution. For example, the provider and the partner provider are branches of the same parent financial institution. Additionally, in some arrangements, the provider is located in a first country (e.g., headquartered in the first country, having the customer account(s) based on the first country), and the partner provider is located in a second country (e.g., headquartered in the second country, having the recipient account based in the second country).

As shown in FIG. 6, the partner provider computing system 106 includes a network interface 400, a customer accounts database 402, and a currency transfer circuit 404. In various embodiments, the network interface 400, customer accounts database 402, and currency transfer circuit 404 are configured similarly to the network interface 300, customer accounts database 302, and currency transfer circuit 308, respectively, of the provider computing system 104.

Accordingly, the network interface 400 facilitates connection of the partner provider computing system 106 to the network 116, and the customer accounts database 402 is configured to retrievably store biographical, mobile wallet, template or reference access credentials, payment account, and/or other account information related to various customers of the partner provider computing system 106 (e.g., including the recipient of the currency transfer). Additionally, the currency transfer circuit 404 may be configured to perform similar functions to the currency transfer circuit 308 described above (e.g., such that the recipient may also perform currency transfers similar to the customer). Furthermore, the currency transfer circuit 404 is configured to process currency transfers to the recipient. In various embodiments, the currency transfer circuit 404 is configured to process the currency transfer via a distributed ledger currency rail, as described in further detail below with respect to FIG. 13.

Figure 7:
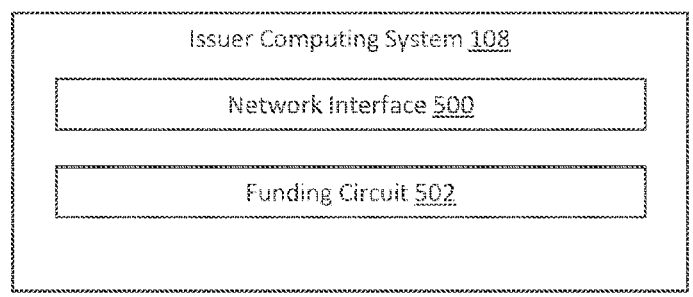
FIG. 7 is a detailed schematic diagram of an issuer computing system of FIG. 1, according to one embodiment.

Referring now to FIG. 7, a detailed schematic diagram of the issuer computing system 108 is shown, according to an example embodiment. In various embodiments, the system 100 includes the issuer computing system 108 as part of a distributed ledger currency rail used for currency transfers. The issuer computing system 108 is associated with an issuer, which serves as a neutral third party in a currency transfer between the provider computing system 104 and the partner provider computing system 106. For example, the issuer computing system may be a neutral financial institution, a banking intermediary, etc. As shown in FIG. 7, the issuer computing system 108 includes a network interface 500 and a funding circuit 502.

The network interface 500 includes program logic and/or components that facilitate connection of the issuer computing system 108 to the network 116. Accordingly, the network interface 500 supports communication between the issuer computing system 108 and other components of the system 100, such as the provider computing system 104, the partner provider computing system 106, and the one or more distributed ledger computing systems 110.

The funding circuit 502 is structured to facilitate the funding of an account held on a distributed ledger currency rail. Accordingly, in various embodiments, the funding circuit 502 is configured to receive a transfer of funds from the provider computing system 104 (e.g., via a correspondent bank). The funding circuit 502 accordingly holds those funds as collateral and establishes an omnibus account or adds funds to an existing omnibus account, such as by issuing cash states that serve as digital tokens representing the collateral funds, for the provider computing system 104 on the distributed ledger used in the distributed ledger currency rail. The funding circuit 502 is configured to add funds to the omnibus account in a 1:1 ratio of funds received from the provider computing system 104. The funding circuit 502 is similarly configured to receive a transfer of funds from the partner provider computing system 106 (e.g., via a correspondent bank), hold those funds as collateral, and establish an omnibus account/add to an omnibus account for the partner provider computing system 106 on the distributed ledger. Additionally, the funding circuit 502 is configured to remove funds from the associate omnibus account in response to the provider computing system 104 or partner provider computing system 106 requesting a withdrawal of funds from the collateral account or complete defunding of the omnibus account. For example, the funding circuit 502 may destroy cash states held in the omnibus account and transfer a 1:1 corresponding amount of funds from the collateral account to the requesting provider computing system 104 or 106.

The one or more distributed ledger computing systems 110 are associated with the distributed ledger used for the distributed ledger currency rail, in various embodiments. For example, the one or more distributed ledger computing systems 110 may be or include a central computer network storing the distributed ledger, computer nodes posting transactions to the distributed ledger, computer nodes verifying transactions posted to the distributed ledger, and so on. In various embodiments, the distributed ledger may be a closed, permissioned ledger. As such, the one or more distributed ledger computing systems 110 may be associated with one or more trusted entities given access to the distributed ledger for the purposes of posting transactions and verifying transactions posted to the distributed ledger. Alternatively, in some embodiments, the distributed ledger may be a permissionless ledger. Additionally, the distributed ledger may be implemented through an existing distributed ledger system (e.g., R3 Corda, Ethereum, etc.), or the distributed ledger may be implemented through a propriety distributed ledger system.

In some embodiments, the one or more distributed ledger computing systems 110 include the provider computing system 104 and the partner provider computing system 106, which serve as nodes for the provider and the partner provider, respectively, as part of the distributed ledger. In other embodiments, the one or more distributed ledger computing systems 110 include separate computing systems associated with the partner and partner provider and which serves as nodes for the partner and the partner provider as part of the distributed ledger.

As described above, in various embodiments, the one or more distributed ledger computing systems 110 are configured to implement a distributed ledger as part of a distributed ledger payment rail, where transactions, such as currency transfers, are performed through omnibus accounts held on the distributed ledger. These omnibus accounts may be funded through the issuer computing system 108, as described above, and once funded may allow for transfers directly between account providers, such as the provider computing system 104 and the partner provider computing system 106. In some embodiments, each of the provider computing system 104 and the partner provider computing system 106 record transactions on the distributed ledger such that they may be compared and confirmed (e.g., by the notary computing system 112). Accordingly, the distributed ledger payment rail may be used instead of traditional currency rails, such as nostro and vostro accounts and SWIFT. However, because the distributed ledger allows for transactions to be quickly recorded and confirmed, transactions may occur more quickly on the distributed ledger currency rail as opposed to traditional currency rails.

Figure 8:
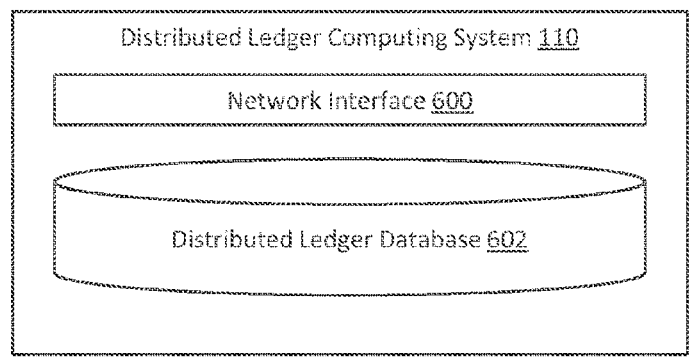
FIG. 8 is a detailed schematic diagram of a distributed ledger computing system of FIG. 1, according to one embodiment.

Referring now to FIG. 8, a detailed schematic diagram of one of the distributed ledger computing systems 110 is shown, according to an example embodiment. It should be understood, however, that each of the one or more distributed ledger computing systems 110 shown in FIG. 1 may be configured similarly to FIG. 8. As shown in FIG. 8, the one or more distributed ledger computing systems 110 each includes at least a network interface 600 and a distributed ledger database 602. It should be understood, however, that in some embodiments, the one or more distributed ledger computing systems 110 may include components in addition to the network interface 600 and the distributed ledger database 602. As an illustration, a given distributed ledger computing system 110 may include an input/output circuit, a display, etc. Additionally, different distributed ledger computing systems 110 may include different components. For example, one distributed ledger computing system 110 may be a central computing system, and another distributed ledger computing system 110 may be a computing system node, and the central computing system and node may include different components.

The network interface 600 includes program logic and/or components that facilitate connection of the distributed ledger computing system 110 to the network 116. Accordingly, the network interface 600 supports communication between the distributed ledger computing system 110 and other components of the system 100, such as the provider computing system 104, the partner provider computing system 106, and the issuer computing system 108.

The distributed ledger database 602 is configured to retrievably store information relating to the distributed ledger. Accordingly, the distributed ledger database 602 may store the entirety or part of a distributed ledger, for example, downloaded from a central computing system or from other distributed ledger computing systems 110. In various embodiments, the distributed ledger database 602 includes a record of accounts held by the provider and the partner provider on the distributed ledger of the distributed ledger currency rail, as well as transactions (e.g., currency transfers) performed through the distributed ledger currency rail.

Figure 9:
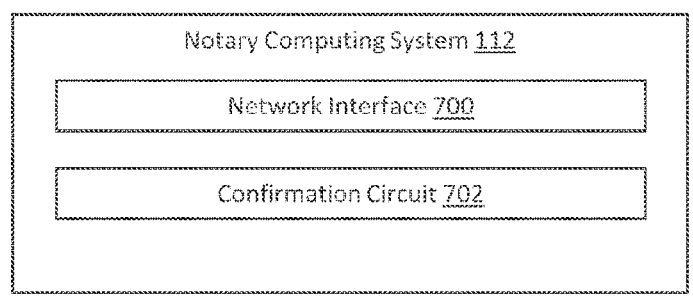
FIG. 9 is a detailed schematic diagram of a notary computing system of FIG. 1, according to one embodiment.

Referring now to FIG. 9, a detailed schematic diagram of the notary computing system 112 is shown, according to an example embodiment. The notary computing system 112 is associated with a notary entity that confirms transactions on the distributed ledger currency rail. For example, the notary entity is a trusted third party for the distributed ledger currency rail. As shown in FIG. 9, the notary computing system 112 includes a network interface 700 and a confirmation circuit 702.

The network interface 700 includes program logic and/or components that facilitate connection of the notary computing system 112 to the network 116. Accordingly, the network interface 700 supports communication between the notary computing system 112 and other components of the system 100, such as the provider computing system 104, the partner provider computing system 106, and the one or more distributed ledger computing systems 110.

The confirmation circuit 702 is configured to verify and confirm transactions on the distributed ledger currency rail. For example, for a given transaction being verified, the confirmation circuit 702 may determine whether the transaction is unique (e.g., that no other transactions matching the transaction being verified have already been recorded on the distributed ledger), verify the digital signatures for the transaction on the distributed ledger, verify timestamps for the transaction on the distributed ledger, and so on. In response to verifying the transaction, the confirmation circuit 702 is configured to confirm the transaction on the distributed ledger by, for example, digitally signing and timestamping the transaction on the distributed ledger. Accordingly, once the transaction is confirmed by the confirmation circuit 702, the transaction (e.g., currency transfer) is carried out (e.g., the currency transfer funds are made available to the recipient). Alternatively, in some embodiments, the system 100 may not include a notary computing system 112. Instead, the currency transfer may be verified by consensus protocol of the distributed ledger itself and not require the verification of a central entity such as the notary.

Figure 10:
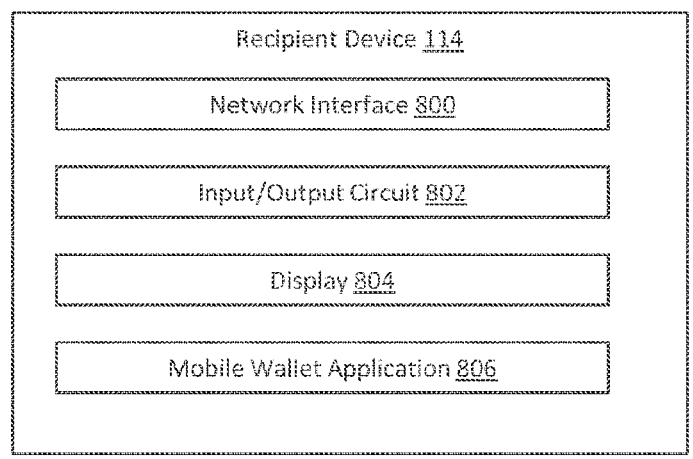
FIG. 10 is a detailed schematic diagram of a recipient device of FIG. 1, according to one embodiment.

Referring now to FIG. 10, a detailed schematic diagram of the recipient device 114 is shown, according to an example embodiment. The recipient device 114 is associated with a recipient of a currency transfer, with the recipient holding an account with the partner provider computing system 106. In some arrangements, the recipient device 114 is a mobile device, such a smartphone, a tablet, a laptop, a smart watch, smart glasses, and so on. Alternatively, in other arrangements, the recipient device 114 is a non-mobile device, such as a desktop computer.

As shown in FIG. 10, the recipient device 114 includes a network interface 800, an input/output circuit 802, a display 804, and a mobile wallet application 806. In various embodiments, the network interface 800, the input/output circuit 802, the display 804, and the mobile wallet application 806 are configured similarly to the network interface 200, the input/output circuit 202, the display 204, and the mobile wallet application 206, respectively, of the customer device 102. Accordingly, the network interface 800 facilitates connection of the recipient device 114 to the network 116, the input/output circuit 802 is structured to receive communications from and provide communications to a user of the recipient device 114, and the display 804 is configured to communicate information to and/or receive communications from the user of the recipient device 114. Additionally, the mobile wallet application 806 may be configured to perform similar functions to the mobile wallet application 206 described above (e.g., such that the recipient may load a mobile wallet account with currency and/or tokenized payment cards, make payments from the mobile wallet using the currency and/or tokenized payment cards, exchange currency, and transfer currency). Furthermore, the mobile wallet application 806 is configured to make funds from a currency transfer available to the recipient in the recipient's mobile wallet (e.g., once the currency transfer has been confirmed by the notary computing system 112 and the partner provider computing system 106 releases the funds to the recipient's mobile wallet). It should be understood that the mobile wallet application 206 may similarly perform the functions of the mobile wallet application 806 (e.g., by making funds from a currency transfer from the recipient to the customer via the mobile wallet application 806 available in the customer's mobile wallet).

However, it should also be understood that the recipient device 114 is exemplary and that in other embodiments, the recipient may receive a currency transfer from the customer in a different manner. For example, the partner provider may release the currency transfer into a demand deposit account held by the recipient such that, for example, the recipient may make payments with the released funds using a payment card (e.g., credit card, debit card). As another example, the partner provider may send the recipient a pre-paid debit card in the amount of the currency transfer that the recipient can use to make payments. As such, the system 100 may not include the recipient device 114 in such embodiments.

Figure 11:
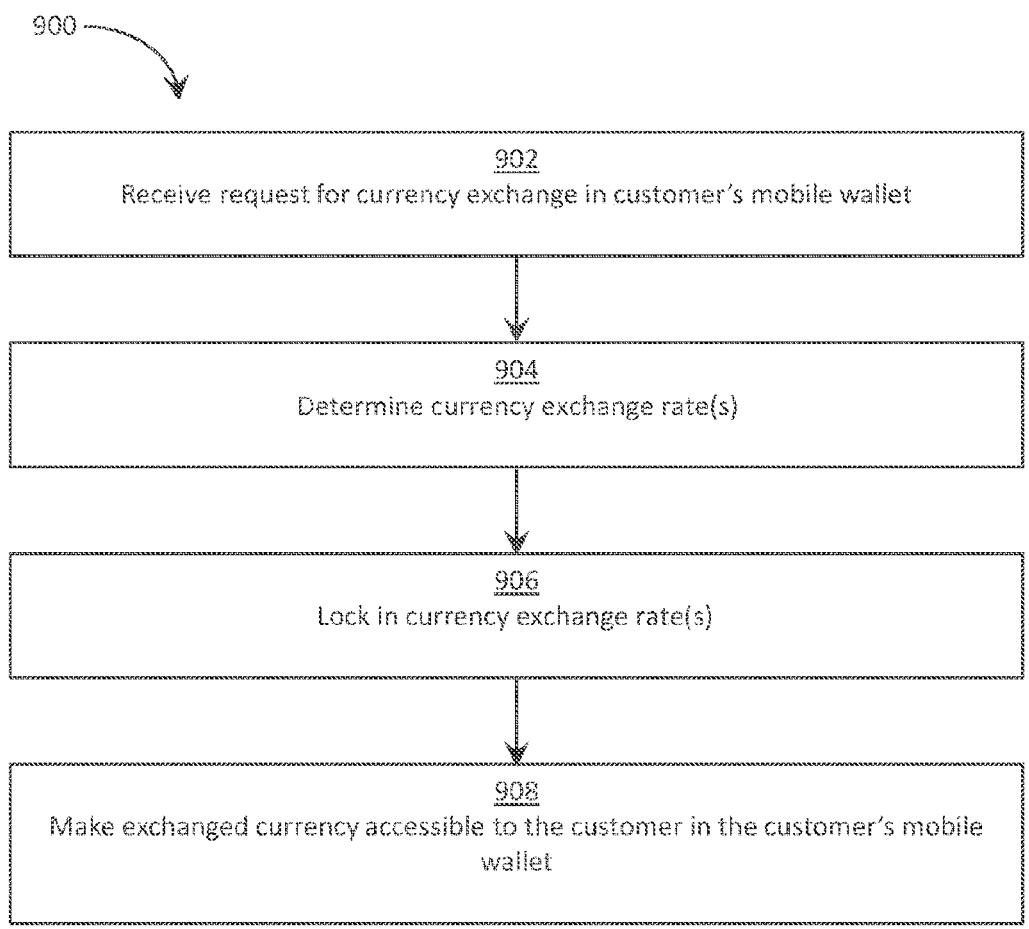
FIG. 11 is a flow diagram showing a process of exchanging currency, according to one embodiment.

Referring now to FIG. 11, a flow diagram of a method 900 of exchanging currency is shown, according to an example embodiment. At 902, the provider computing system 104 receives a request for currency exchange in the customer's mobile wallet (e.g., from the mobile wallet application 206). In some embodiments, through user interfaces provided by the mobile wallet application 206 on the customer device 102, the customer inputs one or more types of loaded, starting currency the customer would like to exchange, one or more types of desired currency the customer would like to receive in the exchange, and the exchange amount (e.g., the loaded, starting amount that the customer would like to exchange and/or the desired amount that the customer would like to receive). As an example, the customer may input that she wishes to exchange $100.00 USD and €50.00 of funds of the customer's mobile wallet account for the corresponding amount in pounds. The customer device 102 then provides the inputs to the provider computing system 104.

At 904, the provider computing system 104 determines the currency exchange rate or rates for the input desired amount. For example, the provider computing system 104 maintains a ledger of exchange rates that are updated periodically (e.g., hourly, daily) or updated instantaneously. The provider computing system 104 may calculate these exchange rates, for example, based on information about markets, prices indexes for the currencies, currency exchange information released by the countries printing the currency, and so on. Additionally, in some embodiments, the provider computing system 104 may optimize the requested currency exchange to decrease costs or fees for the customer. As an illustration, if the customer requests that the provider computing system 104 exchange a first currency and a second currency held by the customer in the mobile wallet for a certain amount of a third currency, the provider computing system 104 may determine whether the first or the second currency has a better exchange rate for the third currency (e.g., a lower exchange rate such that the customer receives more of the third currency per amount of the first or second currency exchanged) and prioritize exchanging the currency in the customer's mobile wallet associated with the better exchange rate.

At 906, the provider computing system 104 locks in the currency exchange rate or rates for the currency exchange request. In some embodiments, the provider computing system 104 locks in the currency exchange rate for a certain amount of time. For example, the provider computing system 104 locks in the currency exchange rate for two minutes, during which time the customer must confirm the currency exchange to receive the listed exchange rate. After the two minutes have expired, the customer must resubmit the exchange request. The customer device 102 may accordingly display user interfaces, via the mobile wallet application 206, that show the customer the amount of time the customer has left to use the locked in exchange rate. In other embodiments, once the provider computing system 104 receives all of the information for the currency exchange, the provider computing system 104 locks in the currency exchange rate and simultaneously carries out the exchange.

At 908, the provider computing system 104 makes the exchanged currency accessible to the customer in the customer's mobile wallet. In some arrangements, the provider computing system 104 performs the currency exchange and makes the exchanged currency accessible to the customer in response to the customer confirming the exchange (e.g., via user interfaces provided through the mobile wallet application 206 within a certain amount of time). As described above with reference to FIG. 3, in some embodiments, the provider computing system 104 creates one or more accounts, each associated with a desired currency that the customer receives as part of the transaction, or one or more partitions within the same account. Alternatively or additionally, the provider computing system 104 uses one or more existing accounts held by the customer or one or more account partitions in an account held by the customer, each associated with a desired currency that the customer receives as part of the transaction. The mobile wallet is synchronized with the one or more new and/or existing accounts such that the customer can make payments from each of the accounts depending on the type of currency that the customer would like to use. In other embodiments, the provider computing system 104 permanently locks in the exchange rate for the exchange amount such that the provider computing system 104 will convert the exchange amount at the locked in exchange rate at the time the customer wishes to make payments or transfers using the exchange currency.

In this way, the provider computing system 104 exchanges at least an amount of a first type of currency for at least an amount of a second type of currency, where the first currency amount is composed of funds of the customer's mobile wallet account (e.g., funds stored in the mobile wallet account, funds of one or more payment accounts linked to the mobile wallet account) and the second currency amount is the currency that the customer desires to receive as part of the currency exchange. It should be understood that the provider computing system 104 may exchange any number of starting currencies for any number of desired currencies. For example, the customer may exchange amounts of two starting currencies for an amount of a desired currency.

Figure 12:
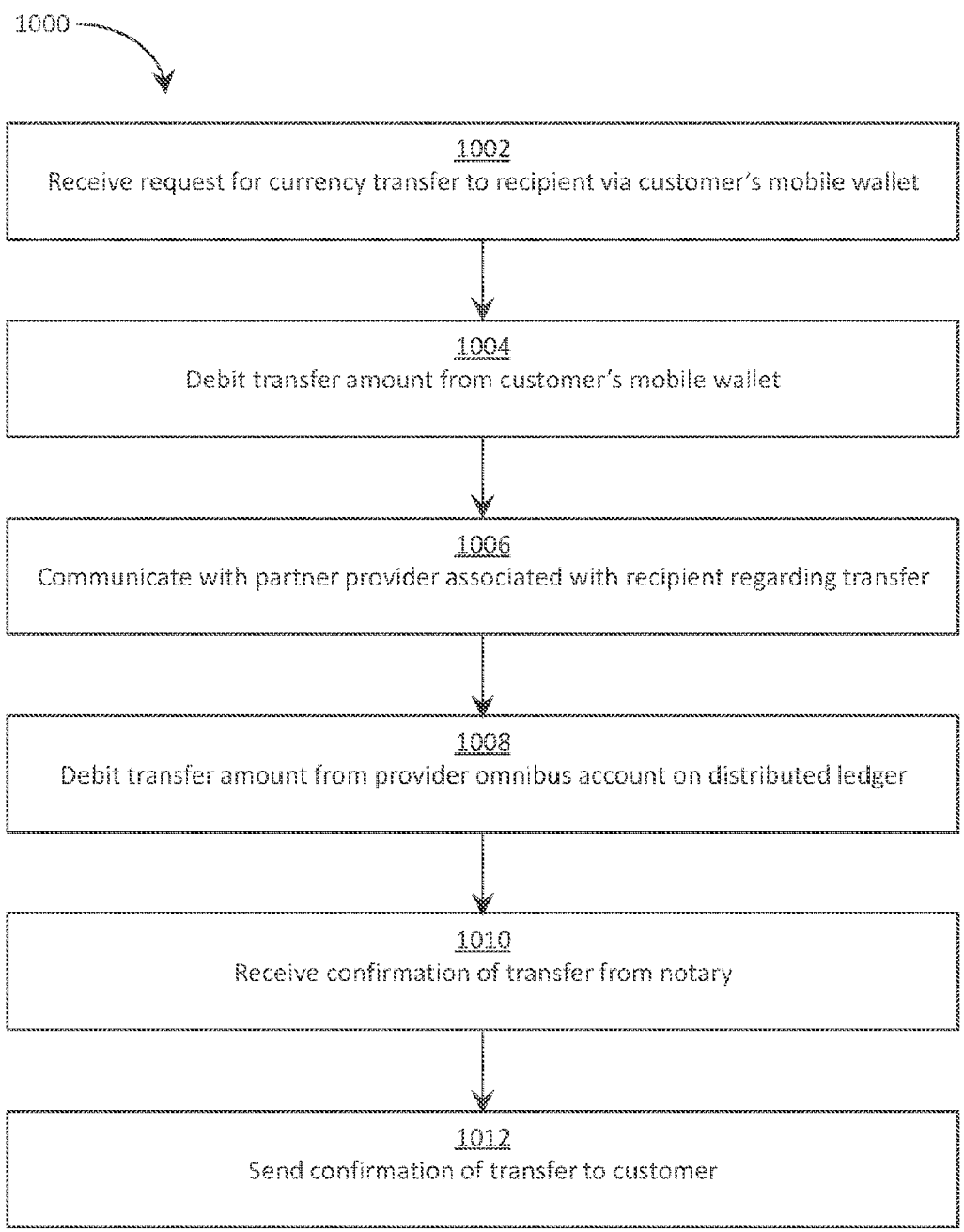
FIG. 12 is a flow diagram showing a process of transferring currency, according to one embodiment.

Referring now to FIG. 12, a flow diagram showing a method 1000 of transferring currency is shown from the perspective of the provider computing system 104, according to an example embodiment. At 1002, the provider computing system 104 receives a request for a currency transfer to a recipient (e.g., via the mobile wallet application 206). In some embodiments, through user interfaces provided by the mobile wallet application 206 on the customer device 102, the customer inputs one or more types of currency the customer would like to transfer and identifies the recipient to which the customer would like to make the currency transfer (e.g., by inputting identifying information associated with the recipient, by finding the recipient through a search function provided on the mobile wallet application 206, by synching the customer's contacts stored on the customer device 102 with the mobile wallet application 206 such that the customer selects one of the customer's contacts, etc.). The customer also inputs the amount of the currency the customer would like to transfer from the customer's mobile wallet and/or the amount of currency the customer would like the recipient to receive. Further, in certain embodiments, the customer also inputs one or more types of currency the customer would like the transfer to be exchanged into. As an example, the customer may identify the recipient by inputting an account token for the recipient (e.g., the recipient's email address or phone number) into the mobile wallet application 206. In some embodiments, the provider computing system 104 identifies the recipient and the partner provider via a global registry that maps recipient account tokens to recipients and their financial institutions (e.g., the partner provider). The global registry may be maintained by the provider computing system 104 or may be maintained by a third party and accessed by the provider computing system 104. Once the recipient is identified, the customer may then input that she wishes to exchange an amount in USD that corresponds to £500.00. Based on the information provided by the customer, the provider computing system 104 identifies the recipient and the partner provider computing system 106 as the recipient's account provider. Alternatively, if not enough information has been provided to make these identifications, the provider computing system 104 requests additional information from the customer (e.g., via the mobile wallet application 206, by sending the customer a follow-up text message or email, etc.).

At 1004, the provider computing system 104 debits the transfer amount from the customer's mobile wallet. For example, the provider computing system 104 may record the debit in the customer's mobile wallet account and record a corresponding credit to an account or ledger held by the provider (e.g., an internal account, the omnibus account on the distributed ledger, etc.). As an illustration, the provider computing system 104 may record the debit in the customer's mobile wallet account and record a corresponding credit to a general ledger held by the provider. The credit in this general ledger then results in an equivalent number of digital tokens being created in the omnibus account for the provider on the distributed ledger. In some arrangements, the provider computing system 104 uses the general ledger to determine an amount of fiat currency to transfer to the issuer computing system 108, which creates a corresponding amount of digital tokens in the omnibus account on the distributed ledger. In other arrangements, recording the credit to the general ledger directly results in the creation of a corresponding amount of digital tokens in the omnibus account (e.g., such that the issuer computing system 108 may not be needed or play a lesser role in the system 100). At 1006, the provider computing system 104 communicates with the partner provider computing system 106 regarding the currency transfer. As an example, the provider computing system 104 sends the partner provider computing system 106 a secure message (e.g., through an existing communication channel or through a communication channel for the distributed ledger currency rail), with the secure message identifying the recipient and the transfer amount. The secure message may further identify the account of the recipient that the currency transfer should be provided to (e.g., based on information provided by the customer, based on preset preferences by the recipient, etc.).

At 1008, the provider computing system 104 debits the transfer amount from an omnibus account on the distributed ledger. In various implementations, the omnibus account acts as an aggregate account that that provider computing system 104 can receive transfers to and make transfers from for a variety of customers. In some embodiments, the omnibus account is used to hold balances for multiple types of currency for the provider. In other embodiments, the omnibus account is used to hold balances for one type of currency, and the provider holds an omnibus account for each type of currency that the provider computing system 104 can transfer.

Additionally, as described above with respect to the issuer computing system 108, in some embodiments, the provider computing system 104 may preload the omnibus account with a certain amount of currency through the issuer computing system 108. For example, the provider computing system 104 may transfer a certain amount of currency to the issuer computing system 108 to hold as collateral (e.g., using nostro and vostro accounts), and the issuer may credit a corresponding amount to the provider's omnibus account on the distributed ledger (e.g., by issuing cash states to the provider's omnibus account). In this way, the provider computing system 104 receives the credited amount of transferred funds in the provider's omnibus account for use in conducting currency transfers. As such, at 1008, the provider computing system 104 may first determine whether the provider computing system 104 has enough funds in the provider's omnibus account to make the transfer before debiting the transfer amount. If the omnibus account does not have enough funds, the currency transfer may fail, and the provider computing system 104 may need to transfer additional funds into the omnibus account via the issuer computing system 108 before the provider computing system 104 can complete the currency transfer. Additionally, in various embodiments, the provider computing system 104 digitally signs and timestamps the debit on the distributed ledger.

At 1010, the provider computing system 104 receives confirmation of the currency transfer from the notary computing system 112. For example, the notary verifies that the transaction is unique on the distributed ledger and that the transaction as recorded by the provider computing system 104 and the partner provider computing system 106 on the distributed ledger (e.g., as debited and credited to their respective omnibus accounts) match, as well as verifies the timestamps and signatures. If verified, the notary computing system 112 signs and timestamps the transfer on the distributed ledger to confirm the transfer. Alternatively, in some embodiments, the consensus protocol of the distributed ledger itself may confirm the transfer without dependency on a notary. At 1012, in response to the confirmation, the provider computing system 104 sends a confirmation of the currency transfer to the customer (e.g., via the mobile wallet application 206, via email, via a text message, etc.).

In some embodiments, as noted above, the customer may request a currency exchange at the same time as the currency transfer. In such embodiments, the method 1000 may further include the method 900 described above with reference to FIG. 9. Accordingly, to facilitate currency exchanges, the omnibus account associated with the provider computing system 104 may include different partitions for each currency held by the provider computing system 104, or the provider may hold more than one omnibus account on the distributed ledger, with each omnibus account associated with a different type of currency. Further, in some embodiments, similar processes as described with reference to method 1000 may be used to conduct a currency exchange. For example, the provider computing system 104 may debit the amount of loaded, starting currency that the customer wants to exchange from the customer's mobile wallet (e.g., from a partition in a customer account associated with the starting currency type, from a customer account associated with the starting currency type). The provider computing system 104 may credit the amount of starting currency to an omnibus account associated with the provider computing system 104 on the distributed ledger (e.g., to a partition of the omnibus account that is associated with the starting currency type, to an omnibus account associated with the starting currency type). The provider computing system 104 may then debit the corresponding amount of desired currency that the customer wants to receive from an omnibus account on the distributed ledger (e.g., from a partition of the same omnibus account, the partition associated with the desired currency type, from an omnibus account associated with the desired currency type) and then credit the corresponding amount of desired currency to the customer (e.g., to a partition in a customer account associated with the desired currency type, to a customer account associated with the desired currency type).

Additionally, it should be understood that in some embodiments, one or more of the above processes may be automated through smart contracts implemented on the distributed ledger. For example, the provider computing system 104 may implement a smart contract on the distributed ledger, with the recipient and the currency transfer amount as input, such that the smart contract automatically performs 1004-1012 using the distributed ledger currency rail (e.g., based on information extracted using keyword searching or predefined fields of the currency transfer request). Further, in some embodiments, performing transfers using the distributed ledger currency rail may be implemented over existing systems and methods for performing transfers. As an example, the provider computing system 104 may be configured to identify SWIFT messages sent by various branches of the accounts provider. The provider computing system 104 may further intercept these messages before these messages are sent out to the SWIFT network, extract details of the transfer from the SWIFT message (e.g., by searching for keywords in the message, by identifying parameters input into predefined fields of the message, by using optical character recognition on the message), and instead implement the transfer using the distributed ledger currency rail. In this way, the provider computing system 104 may advantageously save the accounts provider from having to pay the fees associated with using SWIFT while preserving the same transfer process experience for employees of the provider at the provider's branches.

It should also be understood that the systems and methods described herein may also be used to make currency transfers (including currency transfers that also involve currency exchanges) to recipients holding accounts with the provider. In such cases, the provider computing system 104 may still record the currency transfer on the distributed ledger. For example, the provider computing system 104 may debit the currency transfer amount from the customer's mobile wallet, credit the amount to the provider's omnibus account on the distributed ledger, debit the amount from the provider's omnibus account, and credit the amount to the recipient's account, thereby preserving a record of the transaction on the distributed ledger.

Figure 13:
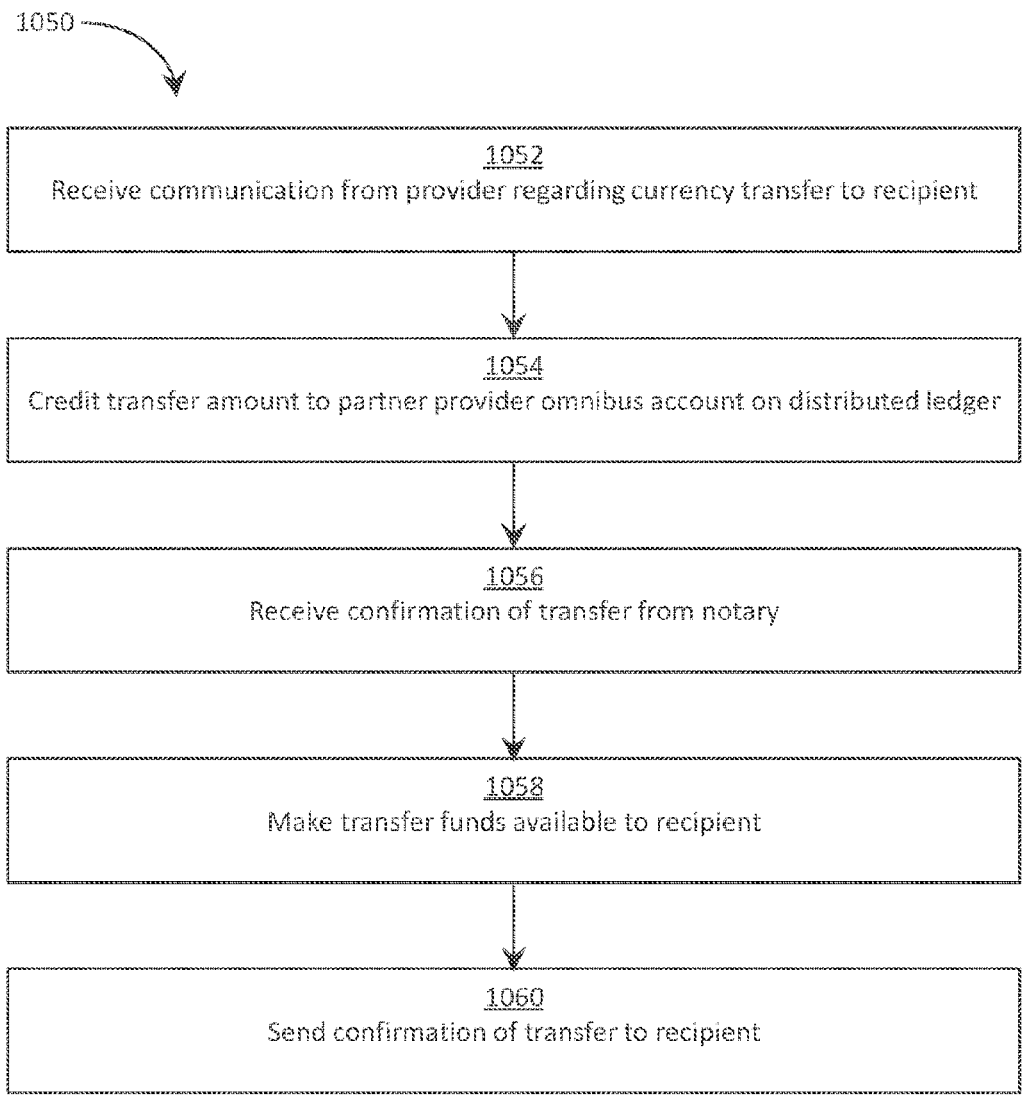
FIG. 13 is a flow diagram showing a process of receiving a currency transfer, according to one embodiment.

Referring now to FIG. 13, a flow diagram showing a method 1050 of receiving a currency transfer is shown from the perspective of the partner provider computing system 106, according to an example embodiment. At 1052, the partner provider computing system 106 receives a communication regarding a currency transfer to the recipient from the provider computing system 104. As described above with respect to 1006 of FIG. 12, the communication may be received as a secure message identifying the recipient. At 1054, the partner provider computing system 106 credits the transfer amount to the partner provider's omnibus account on the distributed ledger (e.g., in response to the provider computing system 104 debiting the transfer amount from the provider omnibus account). In various implementations, the partner provider omnibus account is configured similarly to the provider omnibus account, described above with respect to 1008 of FIG. 13, and may be prefunded via the issuer computing system 108.

At 1056, the partner provider computing system 106 receives a confirmation of the currency transfer from the notary computing system 112. In various embodiments, 1056 occurs similarly to 1010 of FIG. 13, which is described above. At 1058, in response to the confirmation, the partner provider computing system 106 makes the transfer funds available to the recipient. For example, the partner provider computing system 106 may credit the amount of the transfer to a mobile wallet account held by the recipient (e.g., such that the funds are accessible by the recipient via the mobile wallet application 806 on the recipient device 114). As another example, the partner provider computing system 106 may credit the amount of the transfer to a demand deposit account held by the recipient. In some arrangements, as part of 1058, the partner provider computing system 106 may request a withdrawal of funds in the amount of the transfer from the collateral account held with the issuer. In response, the issuer computing system 108 destroys cash states corresponding to the amount of funds held in the partner provider omnibus account and sends the transfer amount in fiat currency to an account or ledger held by the partner provider (e.g., a general ledger account held by the partner provider). In other arrangements, as part of 1058, the partner provider computing system 106 may receive fiat currency directly from the provider computing system 104, including the transfer amount, through existing payment rails. For example, the provider computing system 104 may transfer a deferred net settlement including the transfer amount of method 1050, along with additional transfers made to the partner provider, via traditional nostro and vostro accounts. The deferred net settlement may be performed at the end of a business day, at the end of a business week, etc. The deferred net settlement may be recorded in the distributed ledger by the provider computing system 104, partner provider computing system 106, and/or issuer computing system 108 and may further be confirmed in the distributed ledger by the notary computing system 112. In such embodiments, the issuer computing system 108 may accordingly play a more limited role in the system 100. Additionally, at 1060, the partner provider computing system 106 sends a confirmation of the transfer to the recipient (e.g., via the mobile wallet application 806, via email, via a text message, etc.).

Similar to method 1000 of FIG. 12, it should be understood that in some embodiments, one or more of the above processes of method 1050 may be automated through smart contracts. For example, receiving the communication at 1052 may trigger a smart contract on the distributed ledger that automatically carries out the remaining processes 1054-1060. As another example, once the provider computing system 104 receives the communication at 1052, the provider computing system 104 may implement a smart contract on the distributed ledger that automatically caries out the remaining processes 1054-1060. Additionally, it should further be understood that FIGS. 12 and 13 are intended to be exemplary and that other methods of transferring currency using a distributed ledger currency rail may instead be used with the systems and graphical user interfaces described herein. Additionally, in various embodiments, methods 1000 and 1050 include completing compliance and sanctions checks for each transaction by partnering with the provider and the partner provider.

Referring now to FIGS. 14-44, graphical user interfaces that may be presented to the customer via the mobile wallet application 206 on the customer device 102 are shown, according to various embodiments. It should be understood that these graphical user interfaces are intended to be exemplary and that fewer, additional, and/or different graphical user interfaces may be implemented as part of carrying out the functions of the customer's mobile wallet described below. Graphical user interfaces allowing for different functionalities or capabilities of the mobile wallet may additionally or alternatively be implemented.

Referring first to FIGS. 14-16, graphical user interfaces showing login screens for the customer's mobile wallet are shown, according to example embodiments. FIG. 14 illustrates an opening screen 1100 shown, for example, when the customer opens the mobile wallet application 206 on the customer device 102. In some implementations, the opening screen 1100 may be replaced after a certain amount of time (e.g., allowing the mobile wallet application 206 to boot up on the customer device 102), or the opening screen 1100 may be dismissed by the customer clicking on it (e.g., using a touchscreen of the display 204). The opening screen 1100 is then replaced by a login screen 1200, illustrated in FIG. 15. The login screen 1200 includes a login section 1202 whereby the customer may input login credentials. For example, in the embodiment of FIG. 15, the customer can input a username and password into the login section 1202. In other embodiments, the customer may input other credentials, such as a personal identification number ("PIN") or a biometric (e.g., a fingerprint scanned using the input/output circuit 202 of the customer device 102). The login screen 1200 also includes a login button 1204 that the customer can press to submit the login credentials.

FIG. 16 illustrated a filled-in login screen 1300, where the login section 1202 includes the customer's login credentials (e.g., in the embodiment of FIG. 16, the username "JayneChen92" and a password that is asterisked out for security). As such, when the customer selects the login button 1204, the customer's login credentials are submitted for authentication. In some embodiments, the customer is at least partially authenticated by the mobile wallet application 206. For example, the mobile wallet application 206 may store certain authentication information, such as a biometric, locally on the customer device 102 such that the mobile wallet application 206 can authenticate the credentials. In other embodiments, the customer is at least partially authenticated by the provider computing system 104. As an example, the provider computing system 104 may store authentication credential templates or references in the customer accounts database 302 and use the customer accounts database 302 to authenticate the credentials.

Once the customer is authenticated, the customer is redirected to an account screen. However, in some embodiments, the customer is first provided with information about using the mobile wallet application 206. Referring to FIGS. 17 and 18, graphical user interfaces describing functions of the customer's mobile wallet are shown, according to example embodiments. FIG. 17 illustrates a transaction information screen 1400. The transaction information screen 1400 includes a transaction icon 1402 and instructions 1404 indicating that the customer can see all of her transactions per categories, merchants, and countries in response to pressing the transaction icon 1402. FIG. 18 illustrates an account information screen 1500 that is shown to the customer, for example, after the customer presses the "Ok" button shown on the transaction information screen 1400 of FIG. 17. The account information screen 1500 includes instructions 1502 indicating that the account screen allows the customer to keep track of all of her spending and total balances, illustrated by a demo currency balance 1504 and a demo currency carousel 1506.

In some embodiments, information screens, such as the transaction information screen 1400 and the account information screen 1500, are shown to the customer the first time the customer logs into the mobile wallet using the mobile wallet application 206. In other embodiments, information screens are shown each time the customer logs into the mobile wallet until, for example, the customer changes settings for the mobile wallet. Additionally, it should be understood that the screens illustrated by FIGS. 17 and 18 are exemplary and that additional, fewer, or different information screens may be shown to a customer, such as screens providing information on making currency exchanges and transfers.

Figure 19:
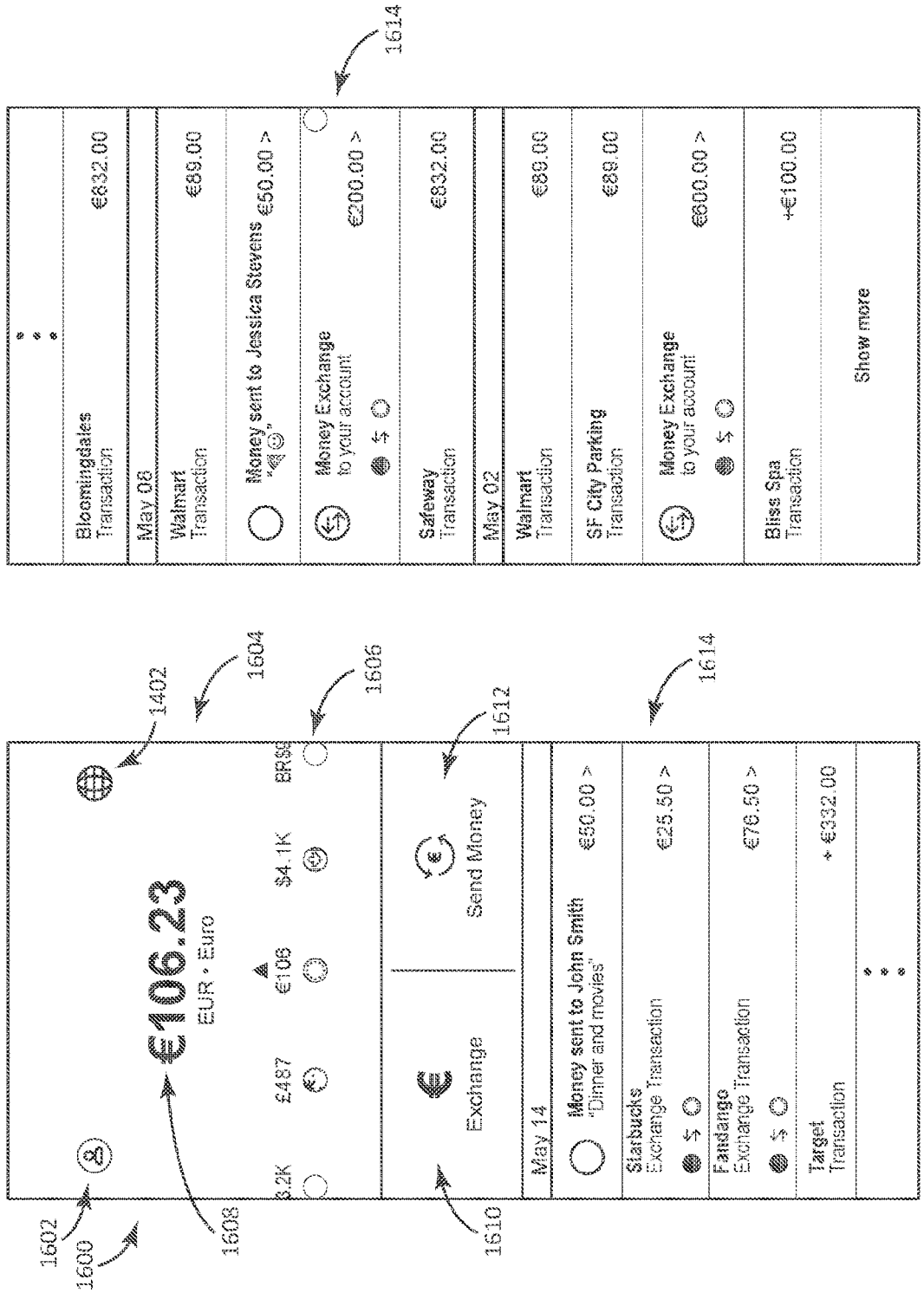
FIG. 19 is a graphical user interface showing an account screen for a mobile wallet, according to one embodiment.

Referring to FIG. 19, a graphical user interface showing an account screen 1600 for the customer's mobile wallet is shown, according to an example embodiment. In some embodiments, the account screen 1600 serves as a home screen for the mobile wallet application 206, and the customer is directed to the account screen 1600 once the customer is authenticated or the customer dismisses all information screens shown to the customer (e.g., after the customer presses the "Ok" button shown on the account information screen 1500 of FIG. 18). In various embodiments, as illustrated in FIG. 19, the account screen 1600 includes the transaction icon 1402 and a profile icon 1602.

Additionally, the account screen 1600 is divided into several sections. A top section 1604 includes a currency carousel 1606 illustrating various currencies enabled in the mobile wallet (e.g., by showing a symbol of the flag of the country or group associated with the currency). For example, the currency carousel 1606 may include all currencies that the customer can use (e.g., to make payments, exchanges, and/or transfers with) in the mobile wallet, the currency carousel 1606 may include only the currencies that the customer has actually used in the mobile wallet, or the currency carousel 1606 may include only the currencies that the customer is holding a balance in within the mobile wallet. The top section 1604 also includes a currency balance 1608 showing the amount of the selected currency that the customer currently holds in her wallet. In the embodiment of FIG. 19, the Euro is selected in the currency carousel 1606, and the currency balance 1608 is €106.23. The top section 1604 further includes an "Exchange" button 1610 that the customer can press to exchange one currency for another currency and a "Send Money" button 1612 that the customer can press to transfer currency to a recipient. A bottom section 1614 includes a list of transactions (e.g., including currency transferred in and out of the customer's mobile wallet) for the selected currency. In the embodiment of FIG. 19, the transactions are listed by date, with each transaction including who the transaction was with, what type of transaction it was, and the amount of the transaction. Additionally, some of the transactions include a small arrow next to the transaction amount that the customer may press, for example, to view additional information about the transaction.

Figure 20:
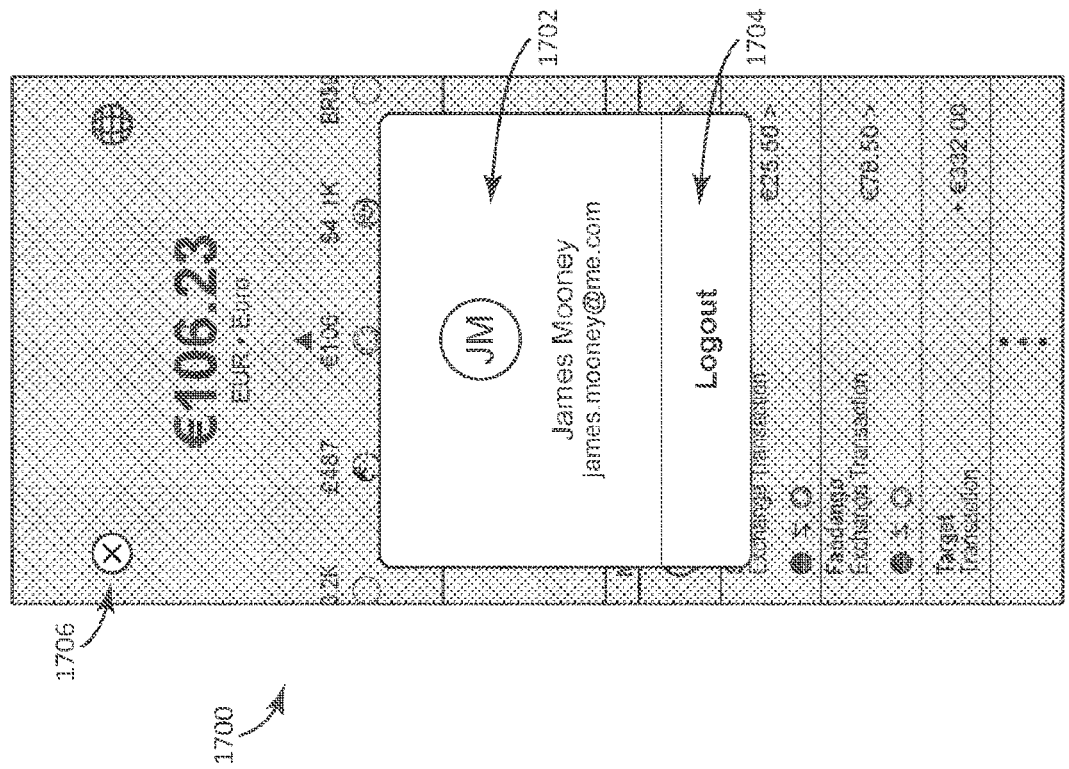
FIG. 20 is a graphical user interface showing a profile screen for a mobile wallet, according to one embodiment.

Referring now to FIG. 20, a graphical user interface showing a profile screen 1700 for the customer's mobile wallet is shown, according to an example embodiment. For example, the customer may access the profile screen 1700 by pressing the profile icon 1602 shown on the account screen 1600. The profile screen 1700 includes a profile section 1702 showing profile information for the customer, such as the customer's name and email address as illustrated in the embodiment of FIG. 20. The profile screen 1700 also includes a logout button 1704 that the customer can press to log out of the customer's mobile wallet. Additionally, the profile screen 1700 includes an exit button 1706 that the customer can press to exit out of the profile screen 1700 and, for example, return to the account screen 1600.

Figures 21, 22, 23:
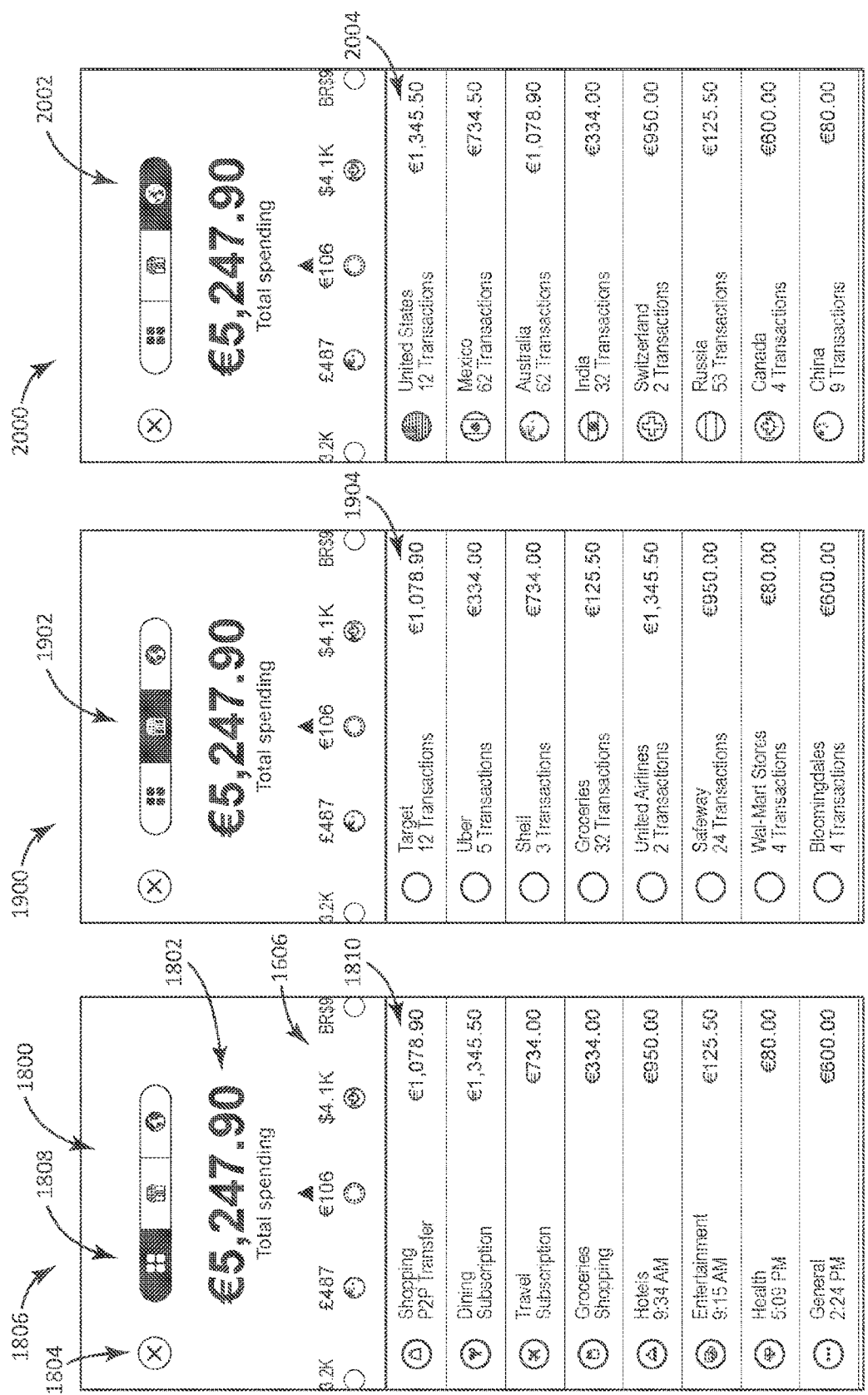
FIGS. 21-23 are graphical user interfaces showing transaction screens for a mobile wallet, according to various embodiments.

Referring now to FIGS. 21-23, graphical user interfaces showing transaction screens for the customer's mobile wallet are shown, according to various embodiments. The customer may view the transaction screens of FIGS. 21-23, for example, by pressing the transaction icon 1402 on the account screen 1600. As illustrated in FIG. 21, each transaction screen includes a transaction type bar 1800 that the customer can use to select how to view the transactions, the currency carousel 1606, the total spending amount 1802 for the selected currency in the currency carousel 1606, and an exit button 1804 that the customer can press to leave the transaction screens and, for example, return to the account screen 1600. In the embodiments of FIGS. 21-23, the Euro has again been selected in the currency carousel 1606, and the customer's Euro total spending amount 1802 is shown as €5,247.90.

FIG. 21 illustrates a transaction category screen 1806 that has been selected using a category button 1808 in the transaction type bar 1800. Alternatively, in some arrangements, the transaction category screen 1806 is shown to the customer because the transaction category screen 1806 is a default screen shown when the customer selects the transaction icon 1402 or the transaction category screen 1806 was the last transaction screen the customer viewed when the customer last accessed the transaction screens. The transaction category screen 1806 includes groupings of transactions 1810 listed by category (e.g., shopping, dining, travel, groceries, hotels, entertainment, health, and general). In some embodiments, the customer may select a category to view more specific information about the transactions falling into that category, such as who each payment was made to and the time and date of each payment. Similarly, FIG. 22 illustrates a transaction merchant screen 1900 (e.g., selected using a merchant button 1902 in the transaction type bar 1800) including groupings of transactions 1904 listed by merchant, and FIG. 23 illustrates a transaction country screen 2000 (e.g., selected using a country button 2002 in the transaction type bar 1800) including groupings of transactions 2004 listed by country (e.g., grouped together according to the country where the recipient or the recipient account for the transaction was based, grouped together according to the country in which the transaction took place, grouped together according to the currencies used by the customer for the various transactions).

Referring now to FIGS. 24-29, graphical user interfaces showing account cell information screens for the customer's mobile wallet are shown, according to example embodiments. For example, an account cell information screen may be accessed by the customer selecting a specific transaction after navigating the account screen 1600 or the transaction screens. As shown in FIG. 24, each account cell information screen includes a back button 2100 that the customer can press to navigate backwards (e.g., back to the account screen 1600 or the transaction screens). Each account cell information screen includes various information about the selected transaction. Accordingly, FIGS. 24-29 present examples of the type of information presented to the customer as part of these account cell information screens. It should be understood, however, that FIGS. 24-29 are intended to be exemplary and that other designs of screens and/or screens presenting additional, less, and/or different information may be used in other mobile wallet implementations.

FIG. 24 illustrates an example money sent screen 2102. A heading 2104 for the screen 2102 shows that, for the selected transaction, the customer sent €50.00 in currency to a recipient (e.g., another mobile wallet customer). A transaction information section 2106 provides information on the transaction (e.g., the recipient, the transaction type, the transaction date, and a memo describing the transaction). A currencies section 2108 provides information on the currencies used for the transaction (e.g., how much of each currency was sent as part of the transaction, the exchange rate for each currency sent as part of the transaction). In the example money sent screen 2102, the customer sent the €50.00 in currency using €19.00 in Euros, $31.00 in USD, and P45.00 in rubies stored in the customer's mobile wallet. FIG. 25 illustrates another example money sent screen 2200. A heading 2202 for the screen 2200 shows that, for this transaction, the customer sent €9.99 in currency. Similar to the screen 2102, the example money sent screen 2200 includes a transaction information section 2204 and a currencies section 2206, showing that the customer sent the €9.99 in currency using $6.00 in USD and $385.00 in Mexican pesos stored in the customer's mobile wallet.

Figures 26, 27:
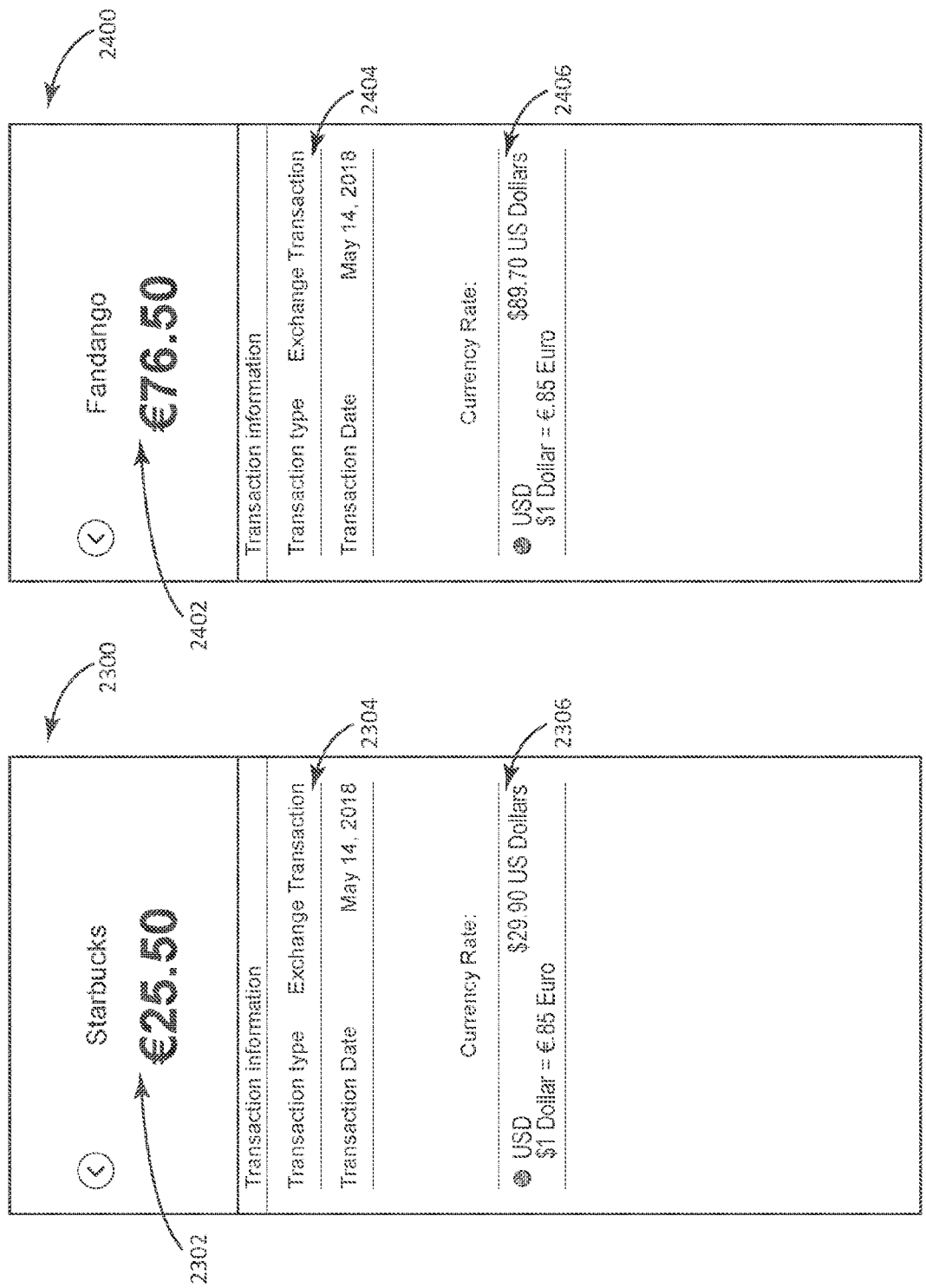

FIG. 26 illustrates an example payment screen 2300. A heading 2302 for the screen 2300 shows that, for the selected transaction, the customer made a payment to Starbucks in an amount of €25.50. A transaction information section 2304 provides information on the transaction, including an indication that this transaction also involved a currency exchange. A currency rate section 2306 shows the currency exchange rate between the loaded, starting currency that was used for the transaction and the final, desired currency provided to the recipient. The currency rate section 2306 also shows the total amount in the loaded, starting currency used for the transaction (e.g., USD in the example of FIG. 26). FIG. 27 illustrates another example payment screen 2400. A heading 2402 for the screen 2400 indicates that, for this transaction, the customer made a payment to Fandango in an amount of €76.50. Similar to the screen 2300, the example payment screen 2400 also includes a transaction information section 2404 and a currency rate section 2406.

Figures 28, 29:
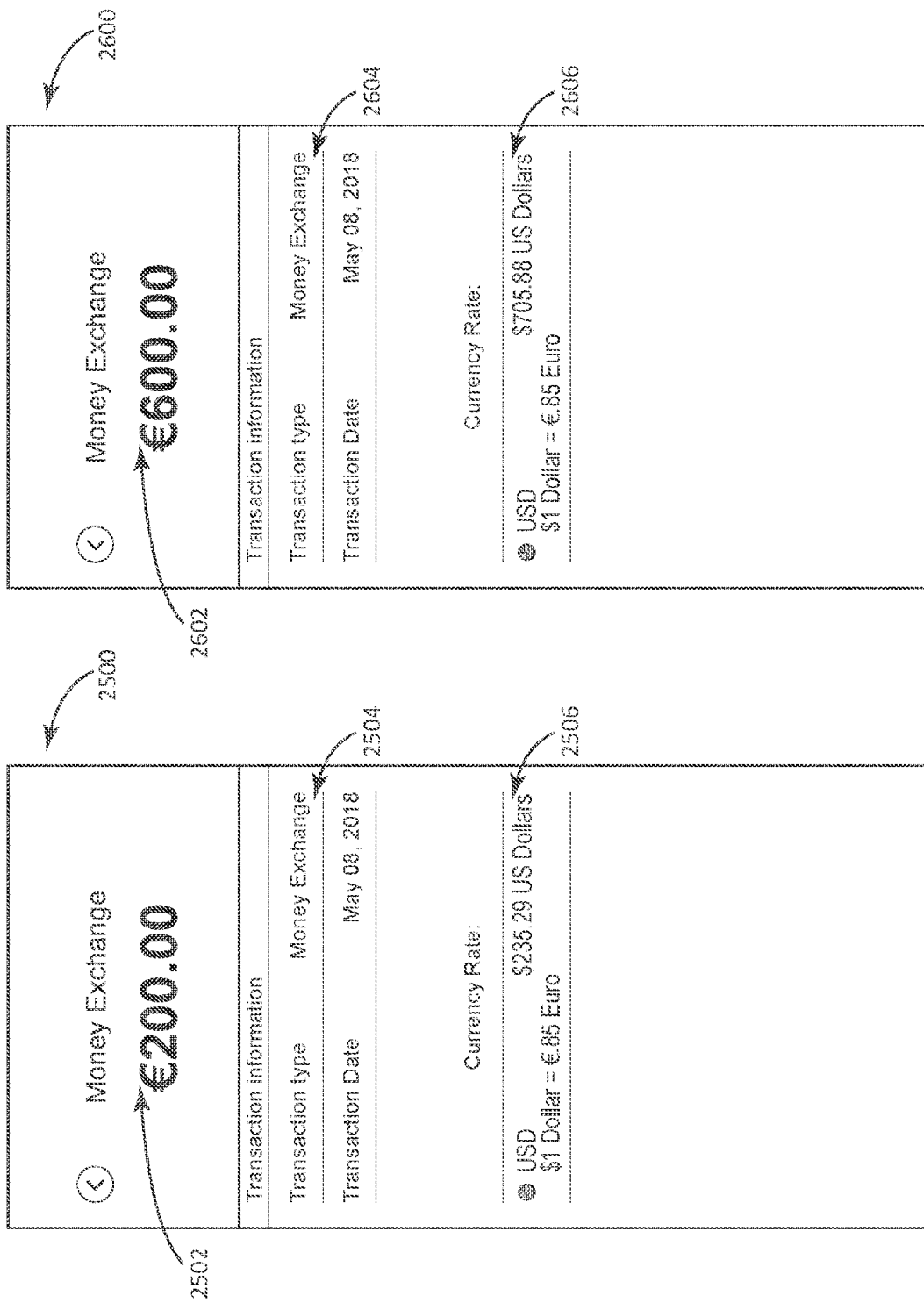

FIG. 28 illustrates an example money exchange screen 2500. A heading 2502 for the screen 2500 shows that, for the selected transaction, the customer exchanged for €200.00 of currency. A transaction information section 2504 (e.g., similar to the transaction information section 2304 of FIG. 26 and the transaction information section 2404 of FIG. 27) provides information on the transaction. Likewise, a currency rate section 2506 (e.g., similar to the currency rate section 2306 of FIG. 26 and currency rate section 2406 of FIG. 27) provides the currency rate that was used for the exchange, as well as the total amount in starting currency (e.g., USD in the example of FIG. 28). FIG. 29 illustrates another example money exchange screen 2600 with a heading 2602 indicating that, for the transaction of screen 2600, the customer exchanged for €600.00. Similar to the screen 2500, the example money exchange screen 2600 also includes a transaction information section 2604 and a currency rate section 2606.

Referring now to FIGS. 30-33, graphical user interfaces showing currency exchange screens for the customer's mobile wallet are shown, according to example embodiments. FIG. 30 illustrates a currency input screen 2700. For example, the customer may access the currency input screen 2700 by pressing the exchange button 1610 on the account screen 1600. As shown in FIG. 30, the currency input screen 2700 includes an exit button 2702 that the customer can press to leave the currency exchange process and, for example, return to the account screen 1600. The currency input screen 2700 also includes a first currency section 2704 that the customer can use to select the type of starting currency that the customer would like to exchange and a second currency section 2706 that the customer can use to select the type of desired currency that the customer would like to receive as a result of the exchange. Additionally, the customer may input, in the first currency section 2704, the amount of starting currency the customer would like to exchange or, in the second currency section 2706, the amount of desired currency that the customer would like to receive using a keypad 2708 provided on the currency input screen 2700. In the embodiment of FIG. 30, the customer has selected USD as the first currency, Euros as the second currency, and input $100.00 as the currency exchange amount. The currency input screen 2700 also includes an exchange rate 2710 between the first and second currencies currently selected (e.g., the current exchange rate, a last updated exchange rate provided to the mobile wallet application 206 by the provider computing system 104). When the customer is satisfied with the currency exchange inputs, the customer can press an exchange button 2712 on the currency input screen 2700 to proceed with the currency exchange.

FIG. 31 illustrates a currency selection screen 2800 through which the customer may select a currency for the currency exchange. For example, the customer may be shown the currency selection screen 2800 by pressing on the down arrow next to the flag icon in the first currency section 2704 or the second currency section 2706 of the currency input screen 2700. As shown in FIG. 31, the customer may select the currency by searching for the currency or country associated with the currency in a search bar 2802, by selecting from a list of most recent currencies 2804, or by scrolling through a list of all available currencies 2806. The currency selection screen 2800 also includes an exit button 2808 that the customer can press to exit out of the currency selection screen 2800 and, for example, return to the currency input screen 2700. In some embodiments, the customer can select multiple currencies in the currency selection screen 2800 such that the customer can input multiple starting currencies to exchange and/or multiple desired currencies to receive. Alternatively, in other embodiments, the currency input screen 2700 shown in FIG. 30 may allow the customer to add additional starting currencies and/or desired currencies such that the customer may provide and/or receive multiple currencies in the exchange.

FIG. 32 illustrates an exchange processing screen 2900. For example, the customer may be shown the exchange processing screen 2900 in response to pressing the exchange button 2712 on the currency input screen 2700. As shown in FIG. 32, the exchange processing screen 2900 includes a progress icon 2902 indicating the amount of currency that the customer will receive as a result of the exchange and the progress of the exchange. For example, the bar surrounding the circumference of the circle in the progress icon 2902 may fill clockwise with green, as shown in FIG. 32, as the currency exchange progresses. When the currency exchange is finished, the customer is redirected to an exchange confirmation screen 3000, illustrated in FIG. 33. The progress icon 2902 thus switches to a confirmation icon 3002, shown in FIG. 33, indicating that the currency exchange is complete. Additionally, the exchange confirmation screen 3000 includes a currencies section 3004 confirming the amounts and types of currencies used for the currency exchange. The customer can then press a "Done" button 3006 to exit out of the exchange confirmation screen 3000 and, for example, return to the account screen 1600.

Figures 34, 35:
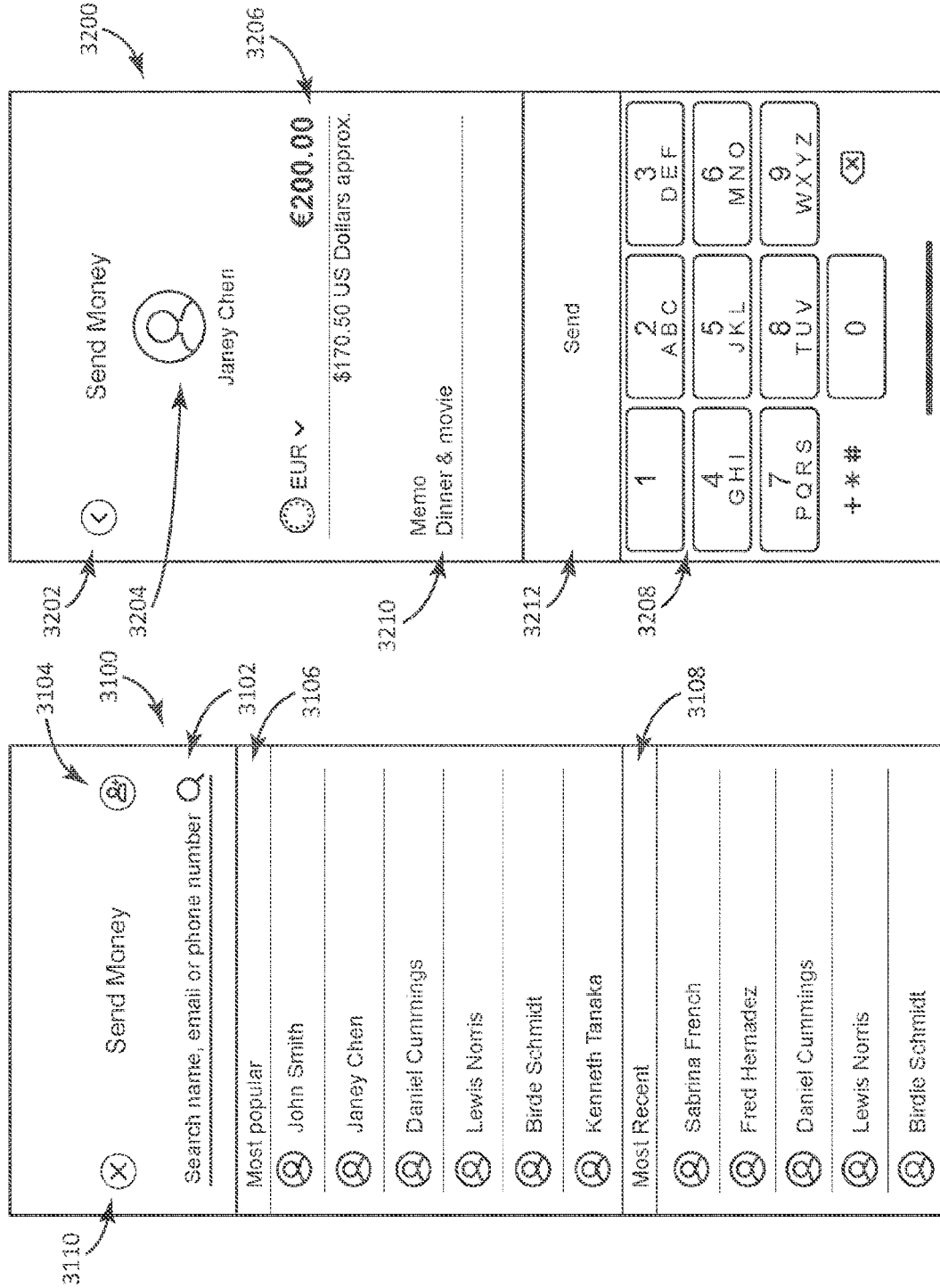
Figure 43:
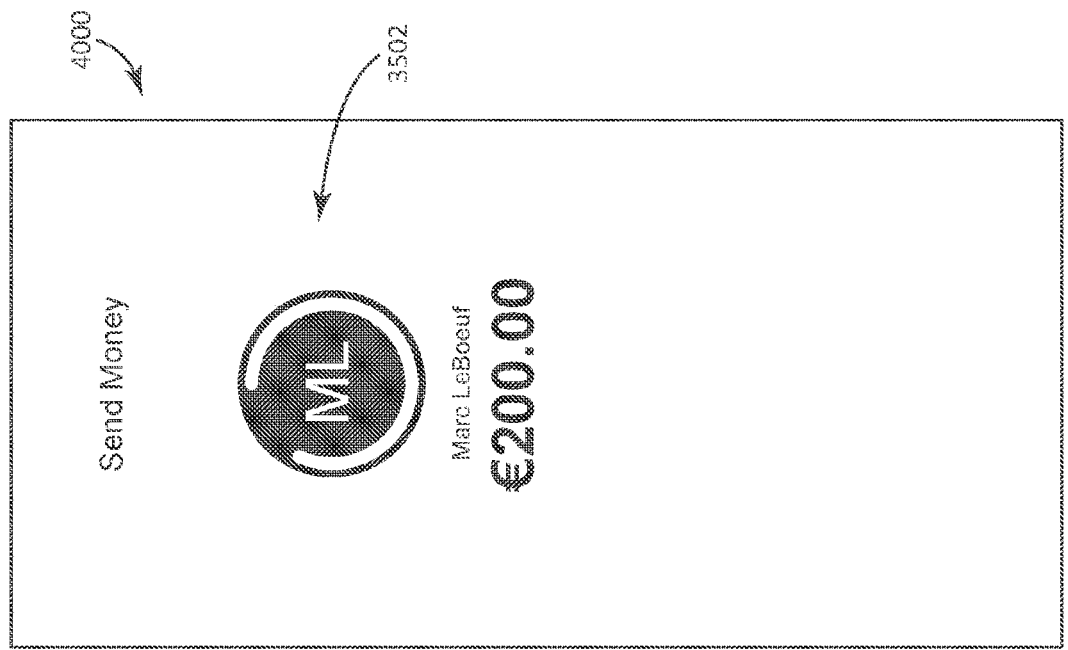

Referring now to FIGS. 34-39, graphical user interfaces showing currency transfer screens for the customer's mobile wallet are shown, according to various embodiments. FIG. 34 illustrates a recipient selection screen 3100 that the customer can use to select the recipient for the currency transfer. For example, as shown in FIG. 34, the customer may select a recipient by searching a name, email, or phone number in a search bar 3102. In some embodiments, searching in the search bar 3102 searches through contacts that the customer has added to the customer's mobile wallet. In certain embodiments, searching in the search bar 3102 additionally or alternatively searches through contacts that the customer has stored on the customer device 102. As such, the customer may use the search bar 3102 to search for a previously added contact. As an alternative, the customer may add a new contact for the currency transfer, for example, by using an add contact icon 3104. In other embodiments, alternatively or additionally, searching in the search bar 3102 searches through all or most (e.g., all public) mobile wallet accounts or mobile wallet profiles held with the provider computing system 104. In such embodiments, to select a new recipient for the currency transfer, the customer may need to add the recipient as a contact using the add contact icon 3104 and/or the recipient may need to set up an account or profile with the provider computing system 104. As shown in FIG. 34, the customer may also select the recipient from a list 3106 of most popular past recipients or a list 3108 of most recent past recipients. Additionally, the customer may exit out of the currency transfer process by selecting an exit button 3110, which redirects the customer, for example, back to the account screen 1600.

Once the customer has selected a recipient using the recipient selection screen 3100, the customer is redirected to a send money screen 3200, as illustrated in FIG. 35. The customer may also go back to the recipient selection screen 3100 by, for example, selecting a back button 3202 provided on the send money screen 3200. The send money screen 3200 includes a profile 3204 of the selected recipient. For example, as shown in FIG. 35, the profile 3204 may include the recipient's name and picture (e.g., if the recipient has added a picture to his or her profile, if the customer has a stored picture associated with the recipient, such as part of a contact application, on the customer device 102). The send money screen also includes a currency section 3206 that the customer may use to select the type of currency the customer would like to send (e.g., which directs the customer to the currency selection screen 2800) and the amount of currency for the transfer (e.g., which the customer may input using a keypad 3208 provided on the send money screen 3200). In some arrangements, the customer inputs the amount and type of currency the customer would like the recipient to receive. In other arrangements, the customer inputs the amount and type of currency the customer would like to send. The send money screen 3200 also includes a memo section 3210 that the customer may use to annotate the reason for the currency transfer. In the embodiment of FIG. 35, the customer has input €200.00 to send to Janey Chen for "Dinner & movie." Once the customer is satisfied with the currency transfer information the customer has input, the customer may select a "Send" button 3212 to proceed with the currency transfer process.

FIG. 36 illustrates a choose currency screen 3300. For example, the customer is directed to the choose currency screen 3300 after pressing the send button 3212 on the send money screen 3200. The customer may also return to the send money screen 3200 by, for example, selecting a back button 3302. The choose currency screen 3300 is configured to facilitate the customer in selecting which loaded currencies the customer would like to use for the currency transfer. As such, the choose currency screen 3300 includes an equivalent total amount 3304 that the customer has selected up to and also indicates the total desired amount that the customer input as wanting to send to the recipient in the send money screen 3200. For example, in the embodiment of FIG. 36, the customer has so far selected an equivalent total amount 3304 of €196.23 of a total of €200.00.

To make the equivalent total amount 3304 reach the total input amount, the customer may select how much of various currencies that the customer is holding in her mobile wallet to send as part of the currency transfer using a currency selection section 3306 of the choose currency screen 3300. For example, in various embodiments, the customer may move various sliders provided in the currency selection section 3306. Each slider is associated with a type of currency that the customer has loaded in the customer's mobile wallet. Additionally, each slider indicates the amount of currency that the customer has selected for the transfer and, if applicable, the exchange rate for the transfer. The right side of the each slider, which represents the maximum amount of that type of currency the customer can transfer, may be set as the total input amount (if the customer has enough of the currency type to fulfill the total input amount with that currency type), as the total amount of that currency type that is loaded in the customer's mobile wallet, based on preset preferences of the customer, based on amounts preset by the mobile wallet application 206 or the provider computing system 104, and so on.

In some arrangements, the currency selection section 3306 may include all currency types that the customer holds in her mobile wallet. Alternatively, in other arrangements, the currency selection section 3306 may include just a subset of the currency types that the customer holds in her mobile wallet, such as the currencies the customer has loaded the most of in the mobile wallet or the currencies with the most favorable exchange rates for the customer (e.g., the three best exchange rates). Further, in some arrangements, the choose currency screen 3300 may automatically show the customer the most favorable combination of currencies to use for the transfer (e.g., the combination of currencies with the most favorable exchange rates), and the customer can later adjust the amount of each currency used for the transfer. In other arrangements, the customer must manually select the amount of each currency. For example, in the embodiment of FIG. 36, the customer has so far selected €106.23 and $150.30 for the currency transfer. Furthermore, in some embodiments, the sliders in the currency selection section 3306 may stop moving to the right once the customer has selected an equivalent total amount 3304 equal to the total amount the customer input for the transfer on the send money screen 3200. Alternatively, in other embodiments, the customer may be able to use the sliders in the currency selection section 3306 to select more than the input amount.

When the customer has finished selecting the amount of each type of currency to be used for the transfer, the customer can proceed with the currency transfer by pressing the "Send" button 3308. In some embodiments, the mobile wallet application 206 and the provider computing system 104 will proceed with the currency transfer once the customer selects the send button 3308 using whatever equivalent total amount 3304 the customer has selected in the currency selection section 3306, regardless of whether the equivalent total amount 3304 is less (or more) than the total amount for the transfer that the customer input on the send money screen 3200. In other embodiments, if the customer selects the send button 3308 without having selected an equivalent total amount 3304 equal to the total amount the customer input on the send money screen 3200, the mobile wallet application 206 and the provider computing system 104 will not proceed with the currency transfer.

For example, the customer may be shown a message instructing the customer to select an equivalent total amount 3304 equal to the input total amount for the transfer. As another example, the customer may not be allowed to press the send button 3308 unless the equivalent total amount 3304 is equal to or within a certain amount of (e.g., within 10% of) the input total amount.

Additionally, in some embodiments, the customer may have a time limit in which to select the equivalent total amount 3304 for the currency transfer, with the time remaining indicated by a timer 3310. For example, in the embodiment of FIG. 36, the customer has a time limit of two minutes. If the customer does not choose the total equivalent amount of currency that the customer would like to send to the recipient within that time limit (e.g., by sliding the sliders and pressing the "Send" button 3308), the customer may be redirected to a timeout screen 3400, as illustrated in FIG. 37. For example, the timeout screen 3400 includes a message 3402 indicating that the two minutes for selecting the currency has expired and that currency rates will be reset. As such, once the customer presses the "Ok" button on the message 3402, the customer will be directed back to the choose currency screen 3300 but with reset currency exchange rates. In other arrangements, the customer may be redirected to an earlier screen in the currency exchange process, such as the send money screen 3200.

FIG. 38 illustrates a transfer processing screen 3500. For example, the customer may be shown the transfer processing screen 3500 once the customer has successfully selected the equivalent amount of starting currency loaded in the customer's mobile wallet to be used for the transfer and selected the send button 3308. As shown in FIG. 38, the transfer processing screen 3500 includes a progress icon 3502 indicating the recipient, the amount and type of currency the recipient will receive, and the progress of the currency transfer. For example, similar to the progress icon 2902, the bar surrounding the circumference of the circle in the progress icon 2902 may fill clockwise with green as the currency transfer progresses. When the currency transfer is finished, the customer is redirected to a transfer confirmation screen 3600, illustrated in FIG. 39. The progress icon 3502 switches to a confirmation icon 3602 indicating that the currency transfer is complete. Additionally, the transfer confirmation screen 3600 includes a currencies section 3604 confirming the amount and type of currency that the recipient has received. In some embodiments, the currencies section 3604 also confirms the amount and type of currency that the customer used for the currency transfer. The customer can then press a "Done" button 3606 to exit out of the transfer confirmation screen 3600 and, for example, return to the account screen 1600.

It should be understood, however, that FIGS. 30-33 are intended to be exemplary of user interfaces used for conducting a currency exchange and that FIGS. 34-39 are intended to be exemplary of user interfaces used for conducting a currency transfer. In other embodiments, different user interfaces may be used, and these different user interfaces may provide additional and/or different functionalities to the currency exchange and/or currency transfer processes. For example, user interfaces may be presented allowing the customer to select multiple types of currency for the recipient to receive as part of a currency transfer. As another example, the user may be able to select the equivalent total amount for a currency transfer using user interface components other than sliders, such as buttons for increasing or decreasing an amount of each currency to be used for the transfer or a textbox allowing the customer to manually input amounts of each currency.

Figures 40, 41:
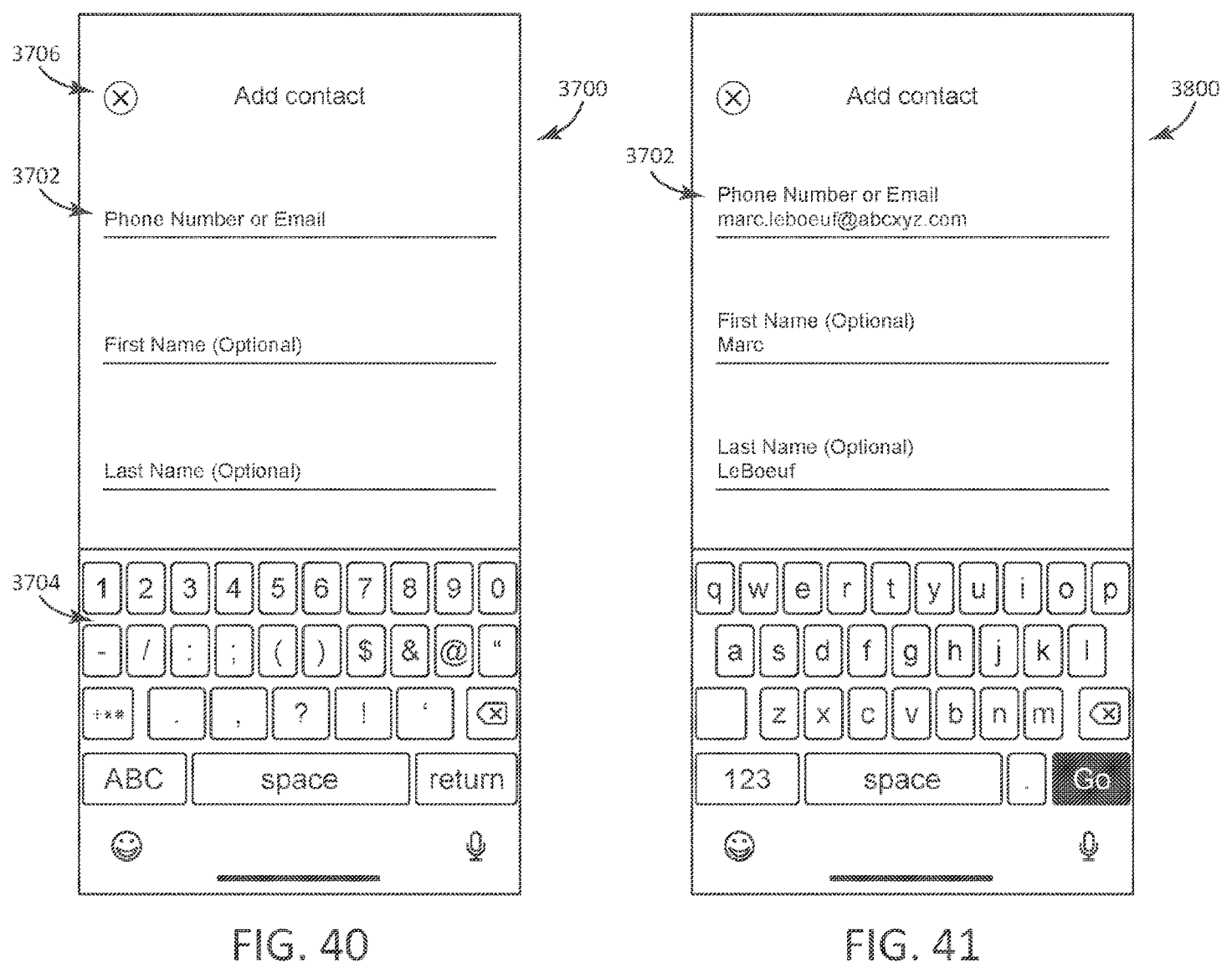

Referring now to FIGS. 40-44, graphical user interfaces showing add contract screens for the customer's mobile wallet are shown, according to example embodiments. For example, the customer may be shown the add contact screens by selecting the add contact icon 3104 on the recipient selection screen 3100. Accordingly, the add contact screens may be used to add a new contact to serve as a recipient for a currency transfer. FIG. 40 illustrates a contact input screen 3700, which includes various input fields 3702 that the customer can use to input information, using a keyboard 3704, about the individual that the customer would like to add as a contact. For example, as shown in FIG. 40, the input fields 3702 may be used to input the new contact's phone number or email and, optionally, first and last name. Additionally, the contact input screen 3700 includes an exit button 3706 that the customer may use to leave the contact input screen 3700 and, for example, return to the recipient selection screen 3100. FIG. 41 illustrates a filled-in contact input screen 3800 including the email, first name, and last name for a new contact that the customer would like to add (e.g., to use as the recipient of a currency transfer).

In some embodiments, the provider computing system 104 is configured to use the input information to find the new contact in a database maintained by the provider computing system 104 (e.g., the customer accounts database 302) or maintained by a partner of the provider computing system 104, such as the partner provider computing system 106 (e.g., the customer accounts database 402). For example, in some embodiments, in response to receiving the contact information via a filled-in contact input screen 3800, the provider computing system 104 accesses a global registry mapping recipient account tokens (e.g., phone numbers, emails) to recipients and their financial institutions. The provider computing system 104 then uses the information about the new contact in the database to make a currency transfer to the new contact. For example, the customer may be shown an error message if the new contact does not have a mobile wallet with the provider computing system 104 such that the new contact cannot be identified in the customer accounts database 302. The individual may have to separately register a mobile wallet with the provider computing system 104 before the customer can add the individual as a new contact. In other embodiments, alternatively or additionally, the provider computing system 104 uses the input information to communicate with the new contact and receive more information about the new contact that the provider computing system 104 may use in making the currency transfer. For example, the provider computing system 104 may send a message to the new contact indicating that the customer would like to make a currency transfer to the new contact and asking for additional information about the new contact's financial accounts (e.g., account information for the recipient, at which institutions the recipient holds financial accounts). The provider computing system 104 then uses this additional information to make the currency transfer to the new contact. As an illustration, in the embodiment of FIG. 1, the provider computing system 104 may identify the partner provider computing system 106 as the new contact's account provider such that the provider computing system 104 is able to make the currency transfer to the partner provider computing system 106, which provides the transferred funds to the new contact.

Figure 42:
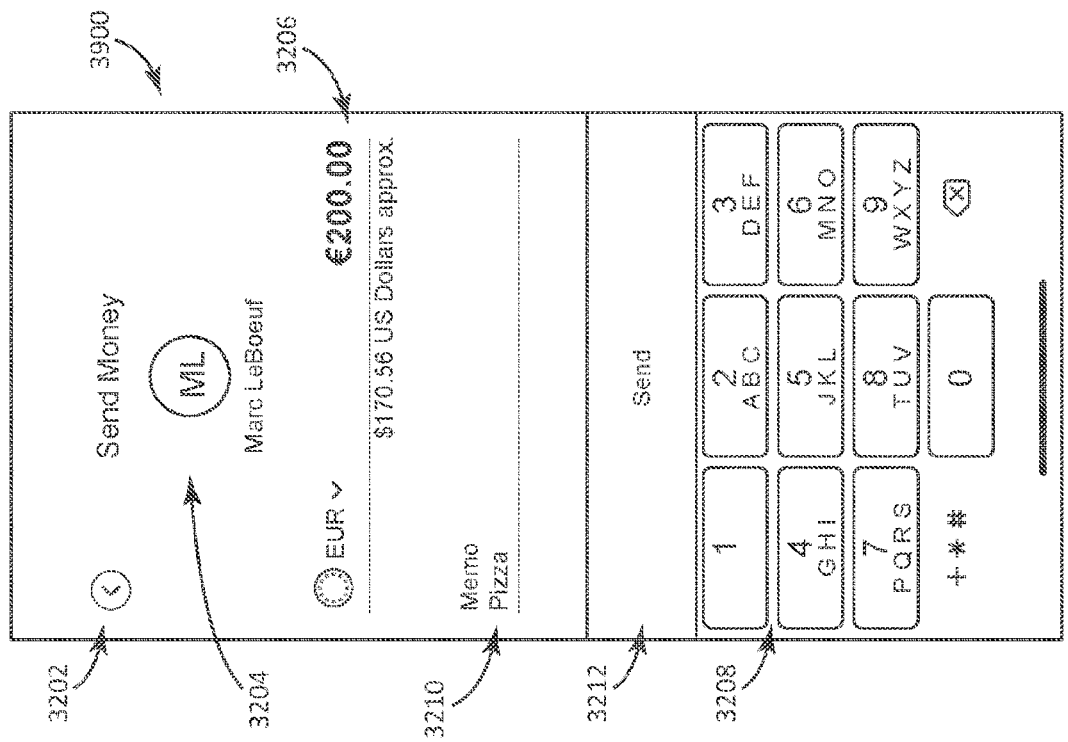
Figure 44:
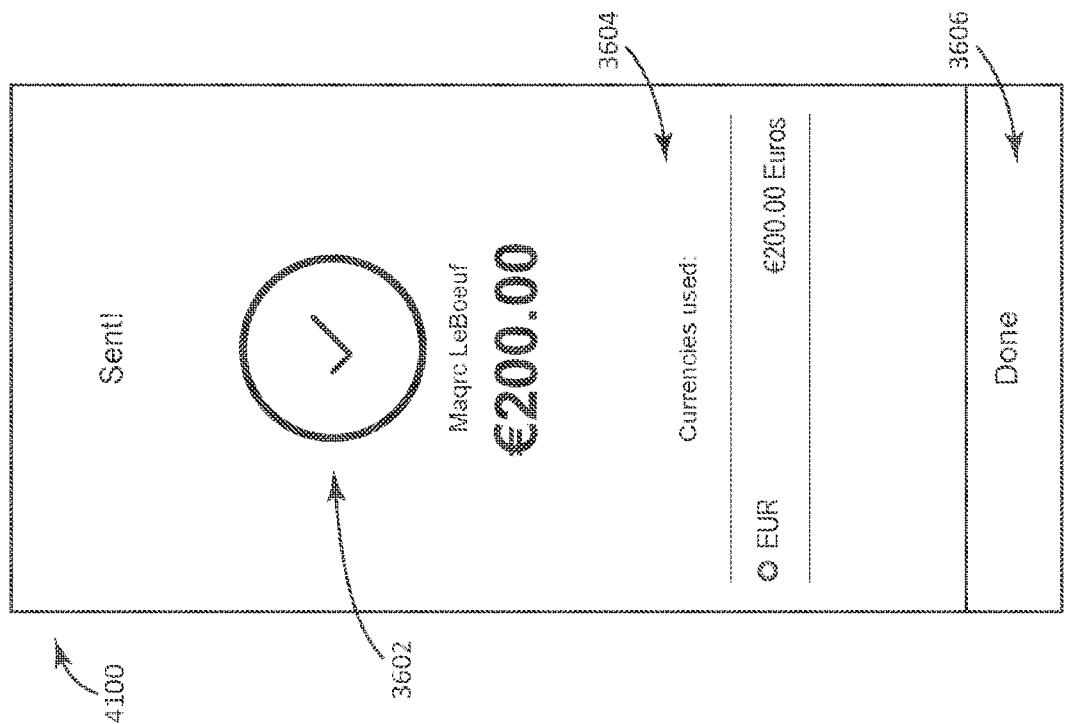

FIG. 42 illustrates a new contact send money screen 3900. In some embodiments, the customer is redirected to the new contact send money screen 3900 after the provider computing system 104 identifies the new contact using the information input at screens 3700 and 3800. In other embodiments, the customer is only able to access the new contact send money screen 3900 after the new contact provides additional information to the provider computing system 104, as described above. In various embodiments, as shown in FIG. 42, the new contact send money screen 3900 is configured similarly to the send money screen 3200 described above with respect to FIG. 35, including the back button 3202, the profile 3204, the currency section 3206, the keypad 3208, the memo section 3210, and the send button 3212. As such, once the new contact is successfully added as the recipient, the currency transfer process proceeds similarly to the process described above with respect to FIGS. 35-39. Accordingly, once the customer has selected the currency to send to the new contact recipient (e.g., a total equivalent amount of loaded currency held in the customer's mobile wallet), the customer is redirected to a transfer processing screen 4000 (shown in FIG. 43) configured similarly to the transfer processing screen 3500 described above, including the progress icon 3502, and a transfer confirmation screen 4100 (shown in FIG. 44) configured similarly to the transfer confirmation screen 3600 described above, including the confirmation icon 3602, the currencies section 3604, and the done button 3606.

The embodiments described herein have been described with reference to drawings. The drawings illustrate certain details of specific embodiments that implement the systems, methods and programs described herein. However, describing the embodiments with drawings should not be construed as imposing on the disclosure any limitations present in the drawings.

It should be understood that no claim element herein is to be construed under the provisions of 35 U.S.C. § 112(f), unless the element is expressly recited using the phrase "means for."

As used herein, in various embodiments, the term "circuit" includes hardware structured to execute the functions described herein. In some embodiments, each respective "circuit" includes machine-readable media for configuring the hardware to execute the functions described herein. The circuit is embodied as one or more circuitry components including, but not limited to, processing circuitry, network interfaces, peripheral devices, input devices, output devices, sensors, etc. In some embodiments, a circuit takes the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" includes any type of component for accomplishing or facilitating achievement of the operations described herein. In one example, a circuit as described herein includes one or more transistors, logic gates (e.g., NAND, AND, NOR, OR, XOR, NOT, or XNOR), resistors, multiplexers, registers, capacitors, inductors, diodes, wiring, and so on.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud-based server). To that end, in certain arrangements, a "circuit" as described herein includes components that are distributed across one or more locations. Further, in various arrangements, the functions of one or more circuits discussed above may be implemented by single circuit (e.g., a processing circuit), or the functions of one circuit discussed above may be implemented by multiple circuits.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, etc. In some embodiments, the one or more processors are external to the apparatus, for example, the one or more processors are a remote processor (e.g., a cloud-based processor). Alternatively, or additionally, the one or more processors are internal and/or local to the apparatus. Accordingly, an exemplary system for implementing the overall system or portions of the embodiments might include general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), etc. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, etc. In some embodiments, the volatile storage media takes the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, a network interface includes cryptography capabilities to establish a secure or relatively secure communication session with other devices in communication with a device that the network interface is provided thereon.

Thus, in these arrangements, personal information about the user of the device, financial data, and other types of data is encrypted and transmitted to prevent or substantially prevent the threat of hacking.

In certain embodiments, an "input/output device" as used herein includes hardware and associated logics configured to enable a party to exchange information with a computing device to which the input/output device is connected. In various embodiments, an input aspect of an input/output device allows a user to provide information to the computing device and includes, for example, a touchscreen, a mouse, a keypad, a camera, a scanner, a fingerprint scanner, an eye scanner, a sensor that detects movement, a microphone, a joystick, a user input device engageable to the computing device via a USB, wirelessly, and so on, or any other type of input device capable of being used with a computing device. In various embodiments, an output aspect of an input/output device allows a party to receive information from the computing device and includes, for example, a display, a printer, a speaker, illuminating icons, LEDs, an output device engageable to the computing device via a USB, wirelessly, and so on, or any other type of output device capable of being used with a computing device.

For the purpose of this disclosure, the term "coupled" means the joining of two members directly or indirectly to one another. Such joining may be achieved with the two members or the two members and any additional intermediate members being integrally formed as a single unitary body with one another, or with the two members or the two members and any additional intermediate members being attached to one another. Such joining may be permanent in nature or may be removable or releasable in nature.

Any foregoing references to currency or funds are intended to include fiat currencies, non-fiat currencies (e.g., precious metals), and math-based currencies (often referred to as cryptocurrencies). Examples of math-based currencies include Bitcoin, Ether, Litecoin, Dogecoin, and the like.

It should be noted that although the diagrams herein show a specific order and composition of method steps, it is understood that in various embodiments the order of these steps differs from what is depicted. As an example, two or more steps are performed concurrently or with partial concurrence. Also, in various embodiments, some method steps that are performed as discrete steps are combined, steps being performed as a combined step are separated into discrete steps, the sequence of certain processes is reversed or otherwise varied, and/or the nature or number of discrete processes is altered or varied. Furthermore, the order or sequence of any element or apparatus is varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or as acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions can be made to the design, operating conditions and arrangement of the embodiments without departing from the scope of the present disclosure as expressed in the appended claim.

What is claimed is:

1. A method, comprising:
providing, using a graphical user interface (GUI) of a wallet application, a customer request associated with a customer, wherein the customer request is a request for a currency transfer between a customer account of the customer associated with a customer provider system to a recipient account of a recipient associated with a recipient provider system, wherein the customer account is associated with a first type of currency and the recipient account is associated with a second type of currency;
presenting, by the GUI of the wallet application, an exchange rate for a time limit and data corresponding to the exchange rate and the time limit;
exchanging, by the wallet application, an amount of the first type of currency for an amount of the second type of currency based on the exchange rate; and
receiving, by the GUI of the wallet application, an indication of a transferred amount for a currency transfer from the wallet application associated with the customer account to the recipient account held by the recipient provider system based on executing a smart contract on a distributed ledger, wherein the distributed ledger is shared between the customer provider system and the recipient provider system;
creating, by the wallet application, a new payment account associated with the second type of currency, wherein exchanging the amount of the first type of currency for the amount of the second type of currency comprises debiting the amount of the first type of currency from a payment account associated with the first type of currency and crediting the amount of the second type of currency to the new payment account associated with the second type of currency; and
presenting, by the GUI of the wallet application, a searchable list of a plurality of currency types.

2. The method of claim 1, further comprising:
presenting, using the GUI of the wallet application, at least one previous transaction and two currency types used to transact.

3. The method of claim 1, wherein the customer request further comprises the request for a currency exchange for the first type of currency for the second type of currency.

4. The method of claim 3, wherein the method further comprises exchanging, by the wallet application, an amount of a third type of currency for an additional amount of the second type of currency, wherein the currency transfer amount further includes the additional amount of the second type of currency.

5. The method of claim 3, wherein the wallet application is linked with one or more payment accounts, each of the one or more payment accounts is associated with a different type of currency, wherein the wallet application is not linked with a payment account that is associated with the second type of currency.

6. The method of claim 1, further comprising presenting of a graphical symbol of a flag of a second country associated with the recipient.

7. The method of claim 1, wherein the execution of the smart contract on the distributed ledger comprises utilizing the recipient and the amount for the currency transfer as input to automatically execute the currency transfer.

8. A system, comprising at least one processor configured to:
provide, using a graphical user interface (GUI) of a wallet application, a customer request associated with a customer, wherein the customer request is a request for a currency transfer between a customer account of the customer associated with a customer provider system to a recipient account of a recipient associated with a recipient provider system, wherein the customer account is associated with a first type of currency and the recipient account is associated with a second type of currency;
present, by the GUI of the wallet application, an exchange rate for a time limit and data corresponding to the exchange rate and the time limit;
exchange, by the wallet application, an amount of the first type of currency for an amount of the second type of currency based on the exchange rate; and
receive, by the GUI of the wallet application, an indication of a transferred amount for a currency transfer from the wallet application associated with the customer account to the recipient account held by the recipient provider system based on executing a smart contract on a distributed ledger, wherein the distributed ledger is shared between the customer provider system and the recipient provider system;
create, by the wallet application, a new payment account associated with the second type of currency, wherein exchanging the amount of the first type of currency for the amount of the second type of currency comprises debiting the amount of the first type of currency from a payment account associated with the first type of currency and crediting the amount of the second type of currency to the new payment account associated with the second type of currency; and
present, by the GUI of the wallet application, a searchable list of a plurality of currency types.

9. The system of claim 8, wherein the at least one processor is further configured to present, using the GUI of the wallet application, at least one previous transaction and two currency types used to transact.

10. The system of claim 8, wherein the customer request further comprises the request for a currency exchange for the first type of currency for the second type of currency.

11. The system of claim 10, wherein the at least one processor is further configured to exchange, by the wallet application, an amount of a third type of currency for an additional amount of the second type of currency, wherein the currency transfer amount further includes the additional amount of the second type of currency.

12. The system of claim 10, wherein the wallet application is linked with one or more payment accounts, each of the one or more payment accounts is associated with a different type of currency, wherein the wallet application is not linked with a payment account that is associated with the second type of currency.

13. The system of claim 8, wherein the at least one processor is further configured to present of a graphical symbol of a flag of a second country associated with the recipient.

14. The system of claim 8, wherein the execution of the smart contract on the distributed ledger comprises utilizing the recipient and the amount for the currency transfer as input to automatically execute the currency transfer.

15. At least one non-transitory processor-readable medium comprising processor-readable media such that, when executed, causes at least one processor to:
provide, using a graphical user interface (GUI) of a wallet application, a customer request associated with a customer, wherein the customer request is a request for a currency transfer between a customer account of the customer associated with a customer provider system to a recipient account of a recipient associated with a recipient provider system, wherein the customer account is associated with a first type of currency and the recipient account is associated with a second type of currency;
present, by the GUI of the wallet application, an exchange rate for a time limit and data corresponding to the exchange rate and the time limit;
exchange, by the wallet application, an amount of the first type of currency for an amount of the second type of currency based on the exchange rate; and
receive, by the GUI of the wallet application, an indication of a transferred amount for a currency transfer from the wallet application associated with the customer account to the recipient account held by the recipient provider system based on executing a smart contract on a distributed ledger, wherein the distributed ledger is shared between the customer provider system and the recipient provider system;
create, by the wallet application, a new payment account associated with the second type of currency, wherein exchanging the amount of the first type of currency for the amount of the second type of currency comprises debiting the amount of the first type of currency from a payment account associated with the first type of currency and crediting the amount of the second type of currency to the new payment account associated with the second type of currency; and
present, by the GUI of the wallet application, a searchable list of a plurality of currency types.

16. The at least one non-transitory processor-readable medium of claim 15, wherein the at least one processor is further caused to present, using the GUI of the wallet application, at least one previous transaction and two currency types used to transact.

17. The at least one non-transitory processor-readable medium of claim 15, wherein the customer request further comprises the request for a currency exchange for the first type of currency for the second type of currency.

18. The at least one non-transitory processor-readable medium of claim 15, wherein the execution of the smart contract on the distributed ledger comprises utilizing the recipient and the amount for the currency transfer as input to automatically execute the currency transfer.

* * * * *